United States Patent [19]

Matsumoto et al.

[11] Patent Number: 5,513,616

[45] Date of Patent: May 7, 1996

[54] METHOD FOR DETERMINING A FAILURE OF AN EGR APPARATUS

[75] Inventors: Takuya Matsumoto; Toru Hashimoto; Koichi Namiki, all of Kyoto; Kazutoshi Noma, Kusatsu; Yasuhisa Yoshida, Okazaki, all of Japan

[73] Assignee: Mitsubishi Jidosha Kogyo Kabushiki Kaisha, Tokyo, Japan

[21] Appl. No.: 202,161

[22] Filed: Feb. 25, 1994

[30] Foreign Application Priority Data

| Mar. 1, 1993 | [JP] | Japan | 5-039999 |
| Mar. 1, 1993 | [JP] | Japan | 5-040000 |
| Mar. 1, 1993 | [JP] | Japan | 5-040001 |
| Mar. 1, 1993 | [JP] | Japan | 5-040002 |
| Mar. 1, 1993 | [JP] | Japan | 5-040003 |
| Mar. 1, 1993 | [JP] | Japan | 5-040004 |

[51] Int. Cl.$^6$ ............................................. F02M 25/07
[52] U.S. Cl. ............................................. 123/571; 73/118.1
[58] Field of Search ........................... 123/571; 73/117.3, 73/118.1, 118.2; 364/431.06

[56] References Cited

U.S. PATENT DOCUMENTS

| 4,715,348 | 12/1987 | Kobayashi et al. | 123/571 |
| 5,103,655 | 4/1992 | Kano et al. | 73/118.1 |
| 5,137,004 | 8/1992 | Takahata et al. | 123/571 |
| 5,154,156 | 10/1992 | Ohuchi | 123/571 |
| 5,341,300 | 8/1994 | Fujimoto | 123/571 |

FOREIGN PATENT DOCUMENTS 9937   1/1990   Japan.

*Primary Examiner*—Willis R. Wolfe

[57] ABSTRACT

A method for determining a failure of an exhaust gas recalculation (EGR) apparatus in which a failure of the EGR apparatus is determined by determining whether a difference between an intake manifold pressure developed when an EGR valve is open and that developed when the EGR valve is closed falls within a specified range, the EGR valve being temporarily opened and closed while failure determination is being implemented. The failure determination is aborted so as to prevent erroneous determination, if a variation of the engine speed exceeds a specified value during the failure determination, or if a variation of the opening degree of an idling speed control (ISC) valve, disposed in a bypass passage installed in an intake passage of an engine in a manner bypassing a throttle valve, exceeds a specified value during the failure determination, or if a fuel control mode changes during the failure determination. Alternatively, to prevent erroneous determination, an intake manifold pressure difference is corrected in accordance with a variation of the engine speed or a variation of the ISC valve opening degree during the failure determination, or the ISC valve opening degree is fixed during the failure determination.

34 Claims, 21 Drawing Sheets

FIG. 1A THROTTLE 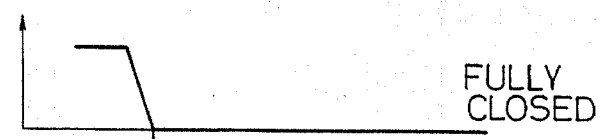
FIG. 1B EGR CHECK MODE 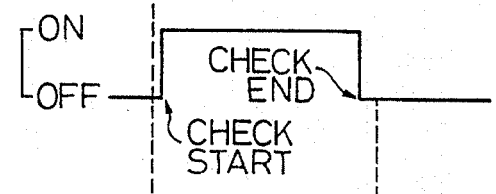
FIG. 1C INTAKE MANIFOLD PRESSURE 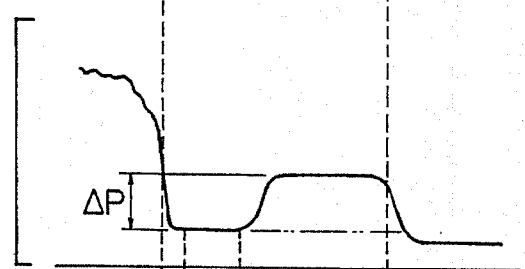
FIG. 1D EGR 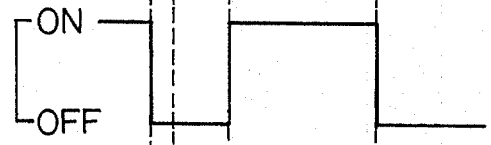
FIG. 1E INTAKE MANIFOLD PRESSURE 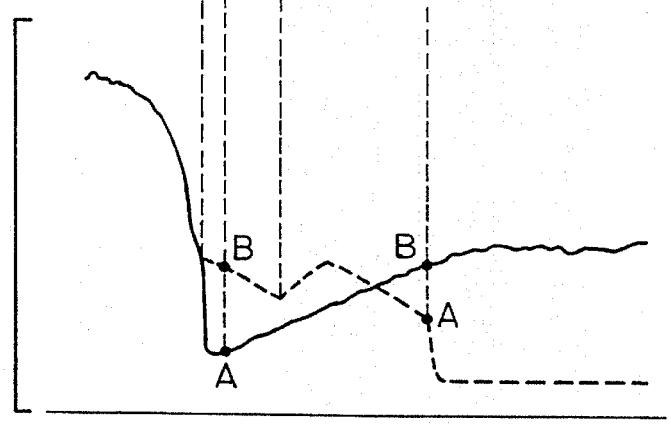

FIG. 11A CONDITION FOR EXECUTING FAILURE DETERMINATION

FIG. 11B EGR SOLENOID

FIG. 11C INTAKE MANIFOLD PRESSURE

FIG. 11D VARIATION OF INTAKE MANIFOLD PRESSURE $\Delta P$

FIG. 11E FAILURE DETERMINATION

FIG. 11F EGR CHECK LAMP

F I G. 20
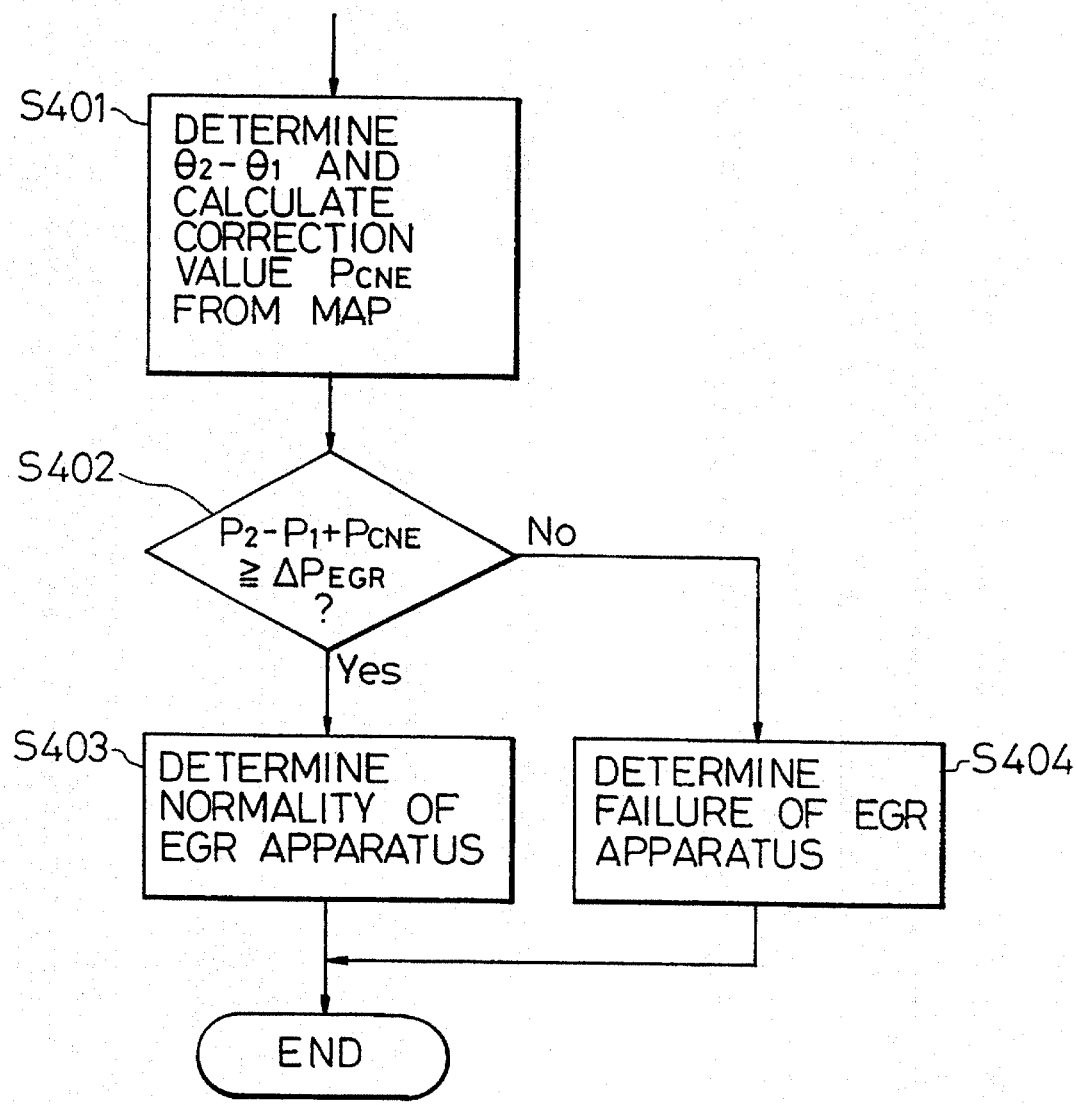

5,513,616

METHOD FOR DETERMINING A FAILURE OF AN EGR APPARATUS

BACKGROUND OF THE INVENTION

The present invention relates to a method for determining a failure in an EGR (exhaust gas recirculation) apparatus.

The major ingredients of the exhaust gas discharged from a gasoline engine are carbon monoxide (CO), hydrocarbon (HC), and nitrogen oxides (NOx). Nitrogen oxides are produced by the chemical reaction between nitrogen and oxygen contained in an air-fuel mixture under a high-temperature condition which takes place when the air-fuel mixture supplied to an engine burns. The majority of nitrogen oxides contained in the exhaust gas is nitric monoxide (NO). Even with the same air-fuel ratio of the air-fuel mixture, if the quantity of inactive ingredients contained in the air-fuel mixture increases, the combustion temperature of the air-fuel mixture lowers with consequent reduction in the nitric monoxide produced when the air-fuel mixture burns.

Based on the fact described above, an EGR apparatus designed to cause part of exhaust gas to be returned to an induction system of an engine to thereby add the exhaust gas to an air-fuel mixture as an inactive ingredient is used for exhaust gas purification.

Further, as a method for diagnosing a failure of an EGR apparatus, "METHOD FOR DIAGNOSING A FAILURE OF AN EXHAUST GAS CIRCULATION CONTROLLER" which performs a failure diagnosis when an engine is running in a decelerated operation zone where fuel supply is cut is disclosed in Japanese provisional patent publication No. H2-9937. According to this diagnosis method, to perform the failure diagnosis, when an engine is in a stable condition following the completion of warm-up, a negative-pressure selector valve provided in a negative-pressure passage is temporarily changed over from an open state to a closed state to thereby introduce an intake pressure into the negative-pressure passage. The intake pressure thus introduced acts on a negative-pressure chamber of an EGR valve, which is disposed in an EGR passage, via an EGR modulator, thereby causing the EGR valve to open to circulate the exhaust gas from an exhaust passage of the engine to an intake passage of the engine via the EGR passage. Then, a difference between the intake pressure developed immediately before the exhaust gas recirculation (EGR) and that developed during the EGR is detected. If the difference is below a preset value, then it is determined that a failure of the EGR apparatus has occurred.

More specifically, according to the aforesaid failure diagnosis method, when a throttle valve is fully closed (FIG. 1A), an EGR check mode is turned ON and check (failure diagnosis) of the EGR apparatus is started (FIG. 1B). Exhaust gas recirculation (EGR) is forcibly carried out between the moment a prescribed time elapses from the time at which the EGR check mode is turned ON and the moment the checking of the EGR apparatus is completed (FIG. 1D). It is determined that the EGR apparatus is working properly, if a variation $\Delta P$ of the intake pressure (intake manifold pressure) between the moment immediately before the EGR is performed and the moment the EGR is being carried out is large, as indicated by a solid line in FIG. 1C. On the other hand, if the variation a $\Delta P$ in the intake manifold pressure is small as indicated by the two-dot chain line in FIG. 1C, then it is determined that a failure has occurred in the EGR apparatus.

According to the aforesaid failure diagnosis method, however, in some cases, accurate determination of the occurrence/absence of a failure in the EGR apparatus cannot be performed.

Causes of such erroneous determination include fluctuations in the intake manifold pressure which result from a change in the engine speed during the EGR check. To be more specific, during the EGR check, if the engine operation state shifts from point A to point B on the engine speed vs. intake manifold pressure characteristic curve obtained when the throttle is fully closed (FIG. 2), causing the engine speed Ne to drop from a value $Ne_A$ to a value $Ne_B$, then the intake manifold pressure increases from point A to point B on the solid line shown in FIG. 1E. If the increase in the intake manifold pressure due to the drop in the engine speed during the EGR check is large, and hence the variation of the intake manifold pressure detected for the EGR check is large, then the EGR apparatus may be erroneously determined to be working properly even when the EGR apparatus has developed a failure. If the engine operation state shifts from point B to point A on the aforesaid characteristic curve during the EGR check, so that the engine speed Ne increases from the value $Ne_B$ to the value $Ne_A$, then the intake manifold pressure changes from point B to point A on the broken line, as shown by the broken line in FIG. 1E. Accordingly, if the variation of the intake manifold pressure, which is detected while the intake manifold pressure is changing under an influence exerted by the increase in the engine speed, is small, the EGR apparatus may be erroneously determined to be faulty even when the EGR apparatus is working properly.

Furthermore, in the aforesaid conventional failure diagnosis method, an engine operation mode switching between a fuel-cut mode and a non-fuel-cut mode may lead to erroneous determination. This is because the combustion of an air-fuel mixture is started or stopped when the fuel-cut mode is released or entered during the EGR check, to cause the intake manifold pressure to be changed.

Specifically, if the EGR check is initiated when the engine is in an operation state which corresponds to point A on the engine speed vs. intake manifold pressure characteristic curve, shown by the solid line In FIG. 3, for the fuel-cut mode, and if the EGR check is completed when the engine is in an operation state which corresponds to point A' on the characteristic curve, shown by the broken line in FIG. 3, for the non-fuel-cut mode, then the intake manifold pressure increases from point A to point A' on the solid line as indicated by the solid line in FIG. 4 as time elapses. If the increase in the intake manifold pressure due to the mode changeover is large and the resulting variation of the intake manifold pressure detected for the EGR check is large, then it may be erroneously determined that the EGR apparatus is working properly while the EGR apparatus actually has incurred a failure. On the other hand, if the EGR check is started with the engine operation state corresponding to point A' in FIG. 3 and completed with the engine operation state corresponding to point A in FIG. 3, then the intake manifold pressure changes from point A' to point A on the broken line, as shown by the broken line in FIG. 4. As a result, the variation of the intake manifold pressure which is detected for the EGR check decreases, and it may be erroneously determined that the EGR apparatus has failed even when it is working properly.

Further, when the conventional failure diagnosis method described above is applied to an engine provided with an idling speed control (ISC) function of automatically adjusting the idling speed in accordance with engine load, the idling speed adjustment performed by the ISC function may lead to erroneous determination. This is because the intake manifold pressure changes when the opening degree of the ISC valve, which is provided in a bypass passage which bypasses a throttle valve, is changed to adjust the idling speed.

Meanwhile, the idling speed adjustment performed by the ISC function is intended to prevent engine stall when engine load increases due to, for example, the actuation of an air conditioner or a power steering pump. When the engine load increases (during idle-up), the opening degree of the ISC valve is increased to supply secondary air to the engine via the bypass passage, thereby running the engine at an idling speed which is higher than an ordinary low idling speed.

The following explains the reason why the idling speed adjustment by the ISC function causes the erroneous determination in the failure diagnosis of the EGR apparatus.

If the EGR check is started when the engine is in the operation state corresponding to point A on the engine speed vs. intake manifold pressure characteristic curve (shown in FIG. 5) obtained when the ISC valve is set at a reference opening degree, and if the EGR check is completed when the engine is in the operation state corresponding to point A' on a similar characteristic curve obtained when the idle-up is carried out, then the intake manifold pressure increases from a value (approximately −520 mm Hg) corresponding to point A in FIG. 5 to a value (approximately −510 mm Hg) corresponding to point A' in FIG. 5 as the opening degree of the ISC valve increases for the idle-up. If the increase in the intake manifold pressure resulting from the change in the ISC valve opening degree is significant with a consequent great variation of the intake manifold pressure, which is detected for the EGR check, then it may be erroneously determined that the EGR apparatus is working properly even when the EGR apparatus has actually incurred a failure. On the other hand, if the EGR check is started with the engine being in an operation state corresponding to point A' of FIG. 5 and completed with the engine being in an operation state corresponding to point A of FIG. 5, then the intake manifold pressure decreases from a value corresponding to point A' to a value corresponding to point A. As a result, the variation of the intake manifold pressure, which is detected for the EGR check, is small, and hence it may be erroneously determined that the EGR apparatus has failed even when it is actually working properly.

As described above, according to the conventional failure diagnosis method, changes in the engine operation states (e.g., engine speed, fuel supply to the engine, and secondary air supply to the engine) other than the intake state in the intake passage of the engine prevents accurate determination of the occurrence/absence of a failure in the EGR apparatus.

OBJECT AND SUMMARY OF THE INVENTION

An object of the present invention is to provide a method for determining a failure of an EGR apparatus, which method enables accurate determination of the presence/absence of a failure in the EGR apparatus even if the engine operation state other than the intake state in the intake passage of an engine changes when the EGR apparatus is being checked for a failure.

According to the present invention, there is provided a method for determining a failure of the EGR apparatus, including an EGR control valve for adjusting an amount of exhaust gas circulated from the exhaust passage of an engine to the intake passage thereof and an EGR control means for controlling the EGR control valve in dependence on an operation state of the engine, by detecting an intake state in the intake passage of the engine by an intake state detecting means while causing the EGR control valve to be temporarily opened and closed while the engine is running in a prescribed operation zone, and by making a determination based on the intake state detected when the EGR control valve is closed and the intake state detected when the EGR control valve is opened.

The failure determining method of the present invention comprises the step of executing either one of the steps (a1) and (a2) when a failure in the EGR apparatus is determined, whereby an error in the determination of a failure of the EGR apparatus is prevented. The step (a1) includes detecting a change in the engine operation state other than the intake state detected by the intake state detecting means, and restricting the determination of a failure of the EGR apparatus in accordance with a change in the engine operation state thus detected. The step (a2) includes restricting a change in the engine operation state other than the intake state detected by the intake state detecting means.

The present invention is advantageous in that the determination of a failure in the EGR apparatus is restricted in accordance with a change in the engine operation state other than the intake state or a change in the engine operation state other than the intake state is restricted when determining a failure in the EGR apparatus, whereby avoiding an error in determining a failure caused by a change in the engine operation state, enabling accurate determination of the presence/absence of a failure of the EGR apparatus even if the engine operation state changes.

These and other objects and advantages will become more readily apparent from an understanding of the preferred embodiments described below with reference to the following drawing figures.

BRIEF DESCRIPTION OF THE DRAWINGS

The invention will become more fully understood from the detailed description herein below with reference to the accompanying figures, given by way of illustration only and not intended to limit the present invention in which:

FIG. 1 shows graphs for illustrating a conventional failure diagnosis method for an EGR apparatus, FIG. 1A showing a change of throttle opening degree with respect to elapse of time, FIG. 1B showing an ON/OFF timing in the EGR check mode, FIG. 1C showing a change of the intake manifold pressure with respect to elapse of time, FIG. 1D showing an ON/OFF timing of the EGR, and FIG. 1E showing a change of the intake manifold pressure with respect to elapse of time;

FIG. 11 shows timing charts which indicate the behaviors of related elements of the EGR apparatus observed when the failure determination routine shown in FIG. 7 through FIG. 9 is implemented, together with time-dependent changes of related parameters, FIG. 11A showing a timing at which a condition for executing the failure determination is satisfied, FIG. 11B showing an ON/OFF timing of an EGR solenoid, FIG. 11C showing changes in the intake manifold pressure, FIG. 11D showing a timing at which a variation $\Delta P$ in the intake manifold pressure is calculated, and a level of a failure determination value $\Delta P_{EGR}$, FIG. 11E showing a failure determination executing timing, and FIG. 11F showing a timing at which an EGR check lamp is turned ON;

FIG. 20 is a flowchart showing a primary part, continued from step S208 of FIG. 14, of the failure determination routine carried out in the failure determination of a fifth embodiment of the present invention;

DETAILED DESCRIPTION

In the following, an EGR (exhaust gas recirculation) apparatus will be explained, to which a failure determination method according to a first embodiment of the present invention is applied.

Figure 2:
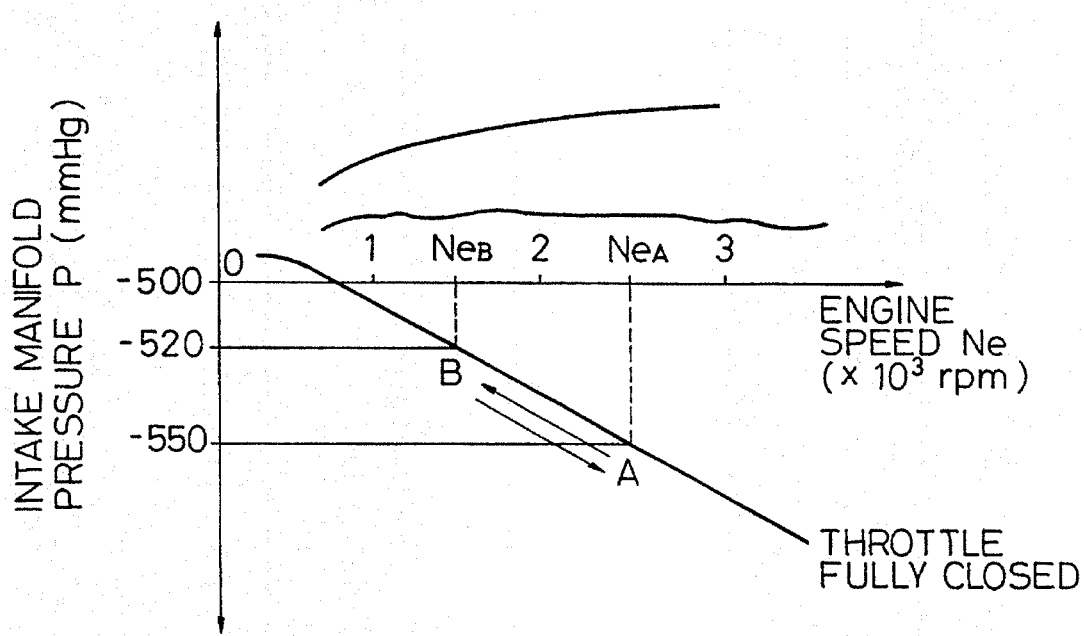
FIG. 2 is a graph showing an engine speed Ne vs. intake manifold pressure P characteristic curve obtained when the throttle is fully closed, together with two other characteristic curves.
Figure 3:
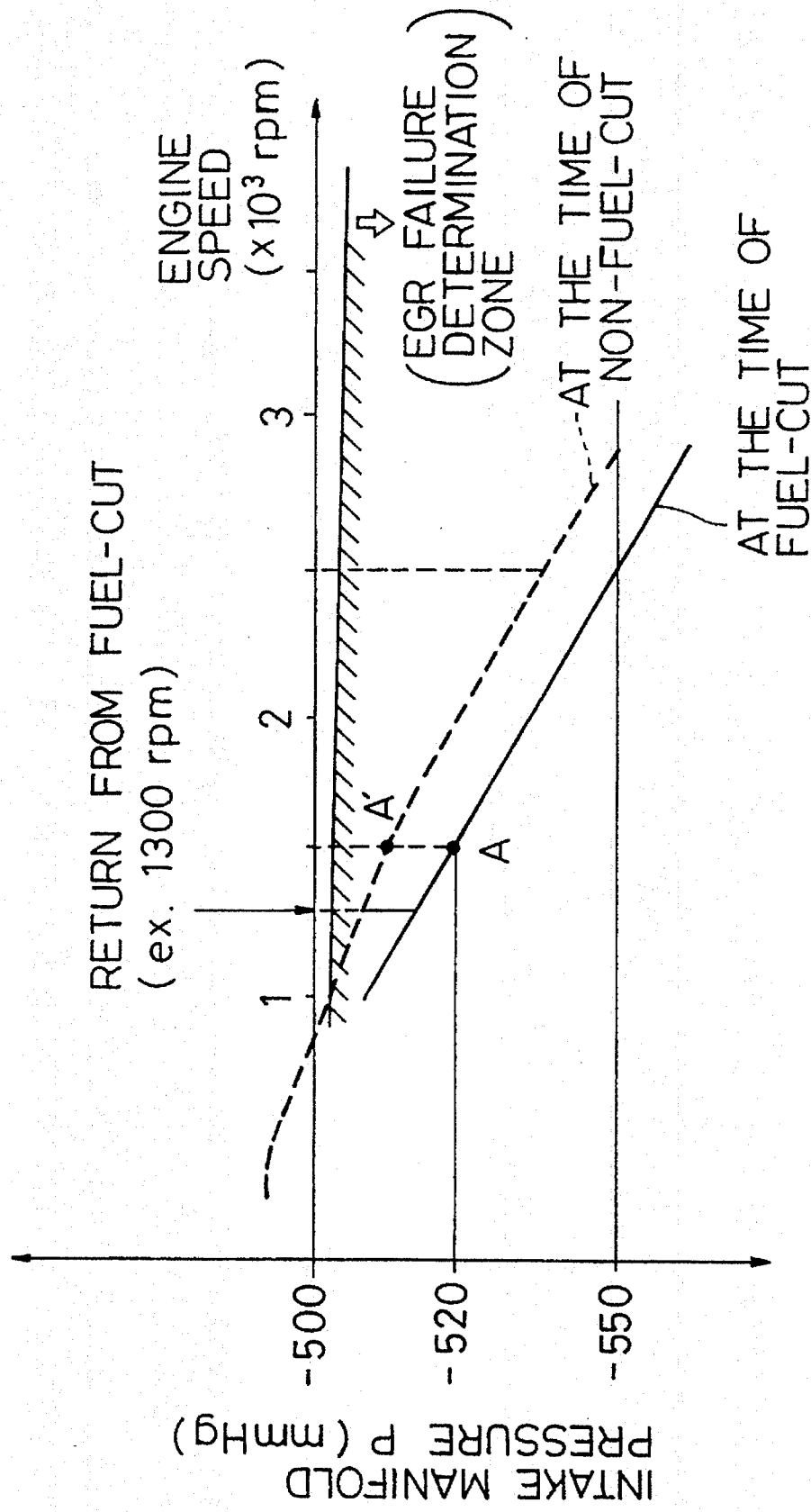
FIG. 3 is a graph showing an engine speed Ne vs. intake manifold pressure P characteristic curve obtained in a fuel-cut mode, together with a characteristic curve obtained in a non-fuel-cut mode.
Figure 4:
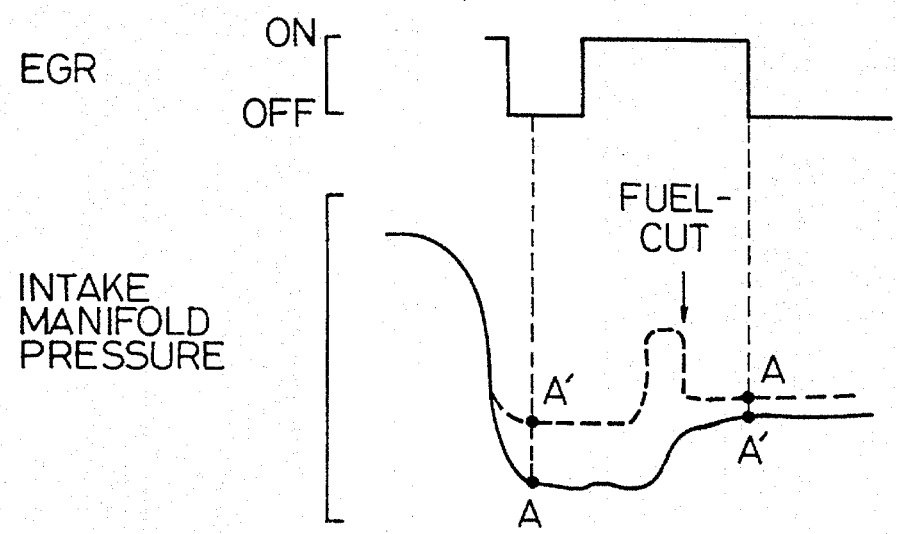
FIG. 4 is a graph showing time-dependent changes in the intake manifold pressure caused by turning ON or OFF of the EGR.
Figure 5:
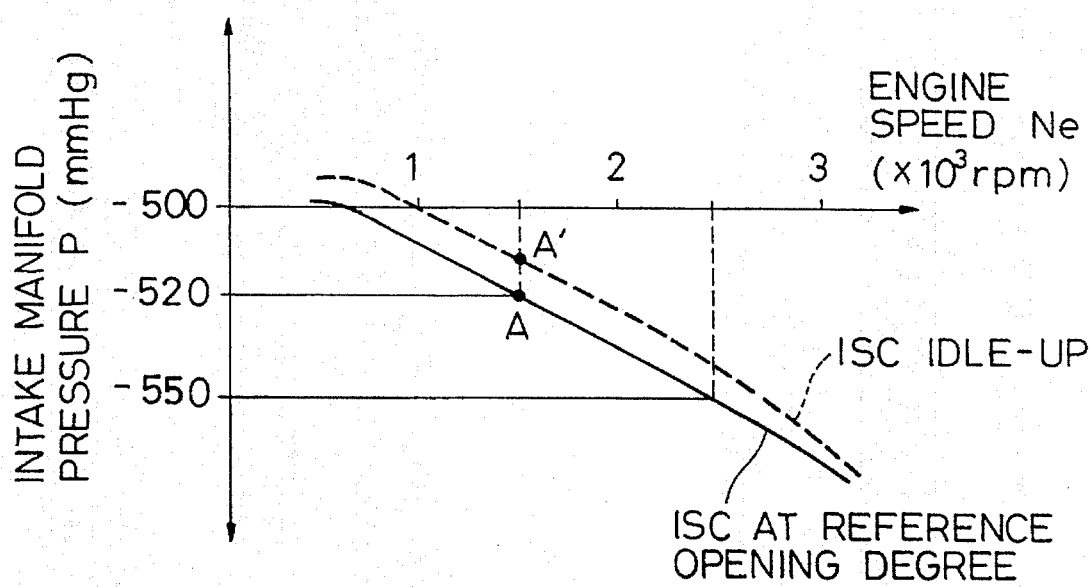
FIG. 5 is a graph showing an engine speed Ne vs. intake manifold pressure P characteristic curve obtained when the ISC valve has a reference opening degree, together with a characteristic curve obtained at the time of ISC idle-up.
Figure 6:
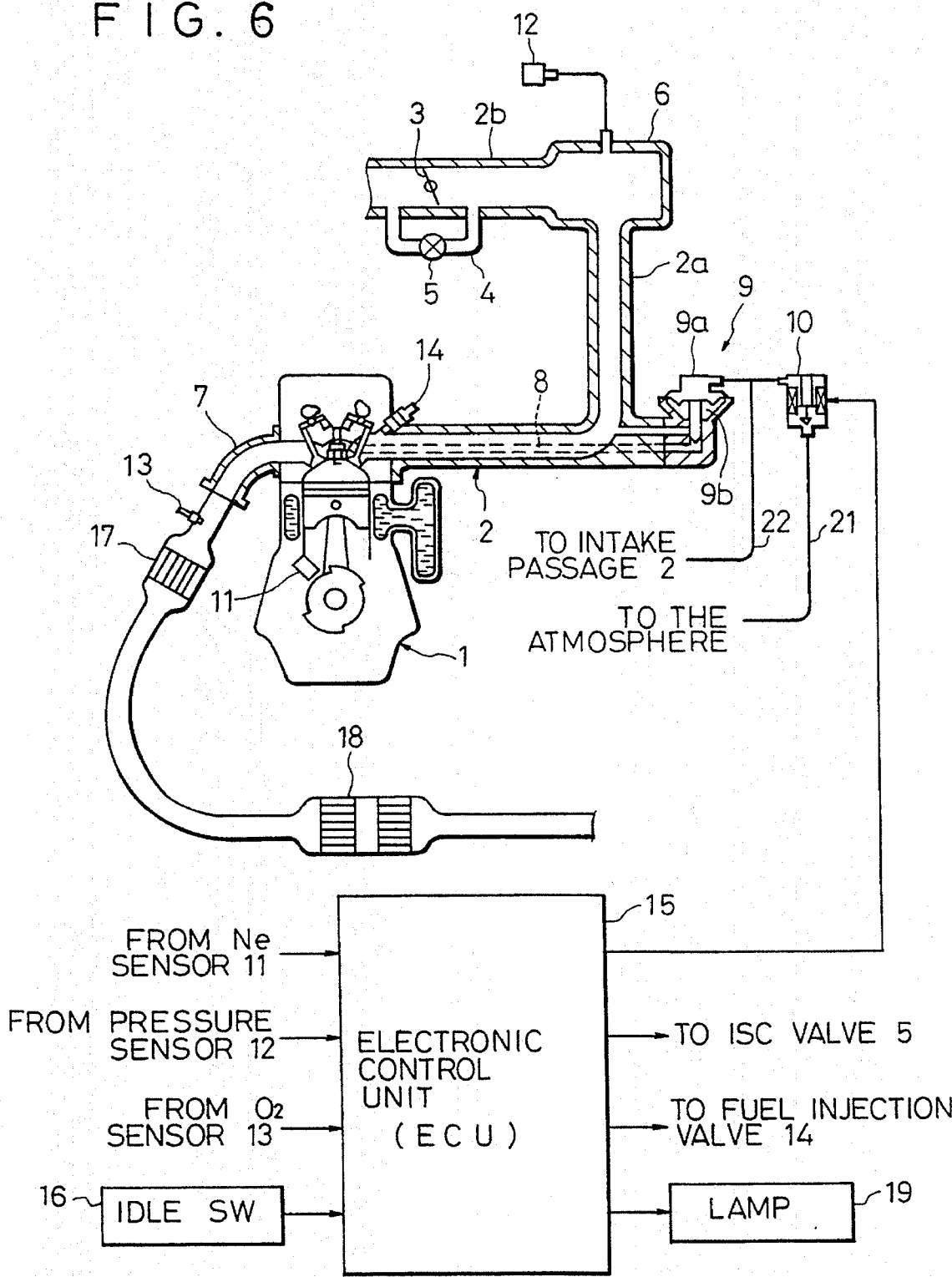
FIG. 6 is a schematic diagram, partly shown in cross section, showing a primary part of an EGR apparatus to which a failure determination method according to a first embodiment of the present invention is applied.

Referring to FIG. 6, an engine 1 is equipped with an intake passage 2 and an exhaust passage 7. The intake passage 2 has an intake manifold 2a. In the intake manifold 2a, a surge tank 6 for preventing intake pulsation is provided on the downstream side of a throttle valve 3, and fuel injection valves 14 are provided for respective cylinders on immediately upstream side of intake valves. The intake passage 2 further includes an intake pipe 2b connected to the intake manifold 2a via the surge tank 6. The exhaust passage 7 is provided with a catalyst apparatus 17 for exhaust gas purification, and a muffler 18 for preventing exhaust noise.

Reference numeral 4 indicates a bypass passage provided on the intake passage 2, bypassing the throttle valve, 3. The bypass passage 4 is provided with an idling speed control valve (hereinafter referred to as "ISC valve") 5 which functions as a bypass control valve. The ISC valve 5 is of a stepping motor-driven type, for example, and the valve opening degree is adjusted by controlling the drive of a stepping motor of the valve 5. When idling the engine 1, the opening degree of the ISC valve 5 is subjected to open-loop control, for example, in accordance with engine load, whereby an amount of secondary air supplied to the engine 1 via the bypass passage 4 and hence the idling speed of the engine 1 are adjusted in accordance with engine load.

The EGR apparatus, which is mounted on the engine 1 and desired to recirculate (flow back) part of the exhaust gas discharged from the exhaust passage 7 of the engine 1 to the intake passage 2, is equipped with an EGR passage 8 extending between that part of the exhaust passage 7 which is located at the upstream side of the catalyst apparatus and that part of the intake passage 2 which is located at the downstream side of the surge tank, an EGR control valve (EGR valve 9) for adjusting the amount of the exhaust gas to be recirculated from the exhaust passage 7 to the intake passage 2 via the passage 8, and an EGR control means for controlling the valve 9 in accordance with the operation state of the engine 1. The EGR control means includes an EGR solenoid valve 10 and an electronic control unit (ECU) 15.

The EGR valve 9 has a negative pressure chamber 9a and a valve chest 9b, which are defined by a casing and a diaphragm of the valve and which are provided on either side of the diaphragm. Disposed in the valve chest 9b is a valve body connected to the diaphragm for opening and closing the EGR passage 8, and in the negative pressure chamber 9a is disposed a spring which energizes the valve body in the valve closing direction. The negative pressure chamber 9a is connected to the intake passage 2 via a pipe 21. A pipe 22 branched from the pipe 21 opens to the air, and the pipe 22 is provided with the EGR solenoid valve 10.

The EGR solenoid valve 10 is comprised of a normally-open electromagnetic valve which includes a valve body for opening and closing the pipe 22, a spring energizing the valve body in the valve opening direction, and a solenoid electrically connected to the electronic control unit 15. The valve 10, which is subjected to ON/OFF duty control by the electronic control unit 15, is designed so that it opens when the solenoid is de-energized (turned OFF) while it closes when the solenoid is energized (turned ON).

When the EGR solenoid valve 10 opens, the air introduced through the pipe 22 flows into the negative pressure chamber 9a of the EGR valve 9 and the valve 9 closes, causing the EGR passage 8 to close. On the other hand, when the EGR solenoid valve 10 closes, the intake negative pressure introduced through the intake passage 2 via the pipe 21 acts on the negative pressure chamber 9a to open the EGR valve 9. This causes the EGR passage 8 to open, and part of the exhaust gas flowing through the exhaust passage 7 is circulated back to the intake passage 2 via the EGR passage 8.

Reference numeral 11 indicates an engine speed sensor, disposed facing a crank shaft of the engine 1, for generating an output pulse each time the crank shaft rotates a specified angle. There are also provided a pressure sensor 12 for detecting the intake pressure (intake information) in the surge tank 6 of the intake passage 2, an $O_2$ sensor 13 for detecting the oxygen concentration in the exhaust gas flowing through the exhaust passage 7, and an idle switch 16 which comes ON when the throttle valve 3 fully closes. Furthermore, there are provided various sensors and switches (not shown) including an air flow sensor for detecting the amount of intake air into the engine 1, a throttle opening degree sensor for detecting the opening degree of the throttle valve 3, an engine cooling water temperature sensor, and auxiliary equipment switches for detecting the operation states of auxiliary equipment such as an air conditioner and a power steering unit.

The electronic control unit 15 includes a computer, memory, I/O circuits, timer, and so on (none of them are shown). Electrically connected to the input side of the unit 15 are valorous sensors including the engine speed sensor (Ne sensor) 11, the pressure sensor 12 and the $O_2$ sensor 13, and various switches including the idle switch 16. Likewise, electrically connected to the output side of the unit 15 are the stepping motor of the ISC valve 5, the solenoid of the EGR solenoid valve 10, an EGR check lamp 19 and the like.

The electronic control unit 15 determines the operation state of the engine 1 primarily in accordance with the engine speed which is detected based on the output pulses received from the engine speed sensor 11, the amount of intake air per cylinder (A/N) which is calculated according to the engine speed thus detected and an output of the air flow sensor, the oxygen concentration in the exhaust gas which is detected by the $O_2$ sensor, and the operation states of the auxiliary equipment which are detected by the auxiliary equipment switches.

The control unit 15, serving as a fuel supply control means, controls the amount of fuel injected from the respective fuel injection valve 14 to the engine 1 in accordance with the engine operation state thus determined. The control unit 15, as an idling speed control means, controls the ISC valve opening degree by controlling the drive of the stepping motor of the ISC valve 5 in accordance with the engine operation state. Further, the control unit 15, serving as an EGR control means, variably adjusts the opening degree of the EGR valve 9 by subjecting the EGR solenoid valve 10 to ON/OFF duty control, thereby variably adjusting the amount of the exhaust gas circulated to the intake passage 2 via the EGR passage 8.

The electronic control unit 15 has a function of determining the presence/absence of a failure in the EGR apparatus, in addition to the fuel supply control function, the idling speed control function, and the EGR control function.

More specifically, the electronic control unit 15, as a failure determining means, changes the EGR amount by temporarily opening and closing the EGR valve 9 when determining a failure, and monitors the change in the pressure in the surge tank caused by the change in the EGR amount. To this end, the control unit 15 reads the pressure sensor output indicative of the pressure level in the surge tank when the EGR valve 9 is closed and when the valve is open, while causing the EGR valve 9 to be opened and closed, and compares the two pressure levels in the surge tank to determine whether the EGR apparatus has failed. When the EGR apparatus is working properly, the EGR amount changes as the EGR valve 9 is opened and closed, and the pressure in the surge tank changes as the EGR amount changes. Hence, when the change in the pressure in the surge tank is smaller than that obtained when the EGR apparatus is working properly, the control unit determines that the EGR apparatus has failed. Incidentally, to minimize the fluctuation in the torque of the engine 1, the failure determination is carried out while the engine 1 is running in a decelerated operation zone.

As mentioned above, erroneous determination may result if the engine speed (the engine operation state in a broad sense) changes while the failure determination is being implemented. In the present embodiment, therefore, the failure determination is interrupted, if the difference between the engine speeds respectively detected at the beginning and the end of the failure determination is great, so that erroneous determination is prevented.

In the following, the method of this embodiment for determining a failure of the EGR apparatus of FIG. 6 will be explained in detail.

Figure 7:
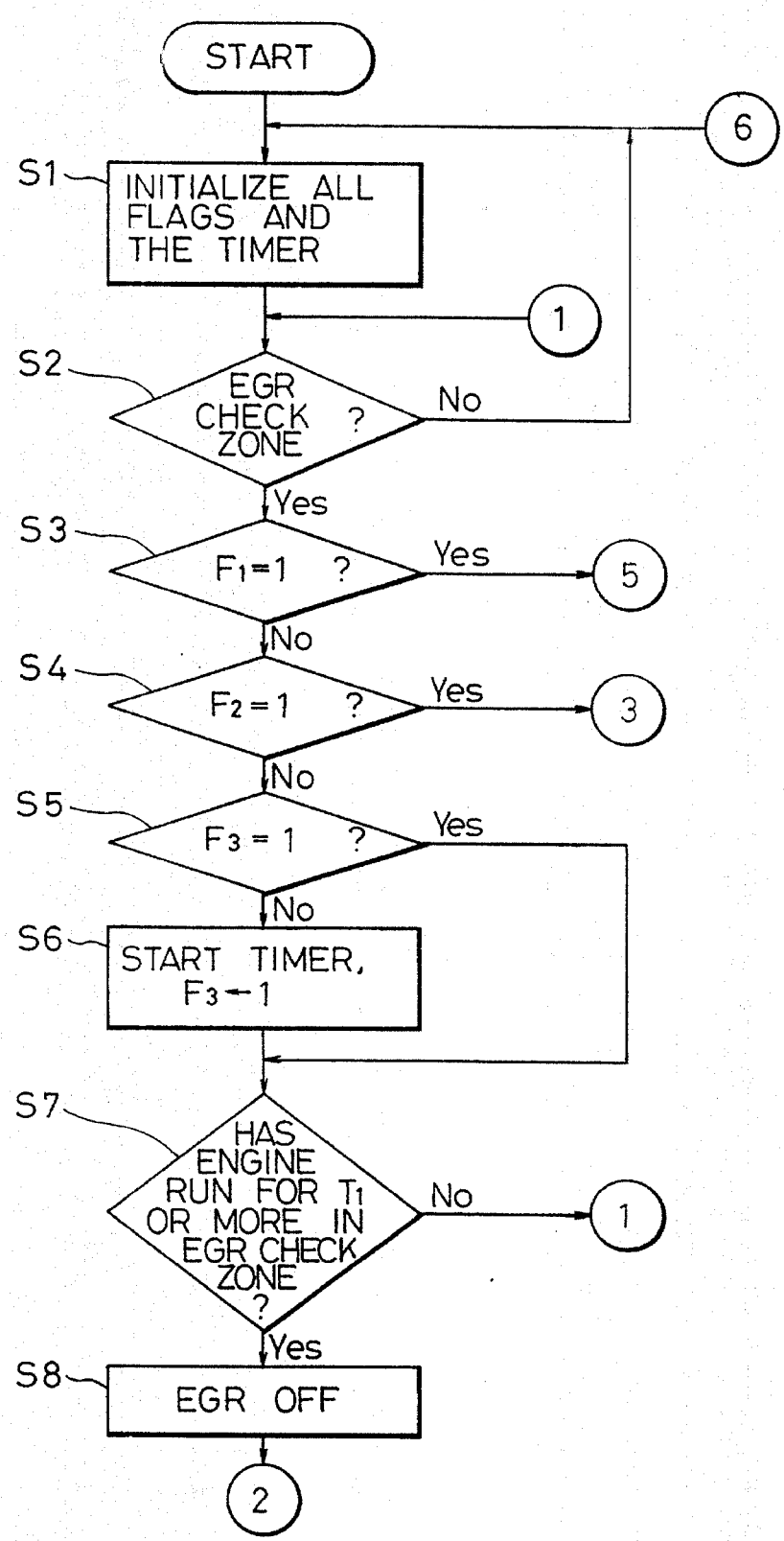
FIG. 7 is a flowchart showing part of a failure determination routine implemented by the electronic control unit shown in FIG. 6.
Figure 8:
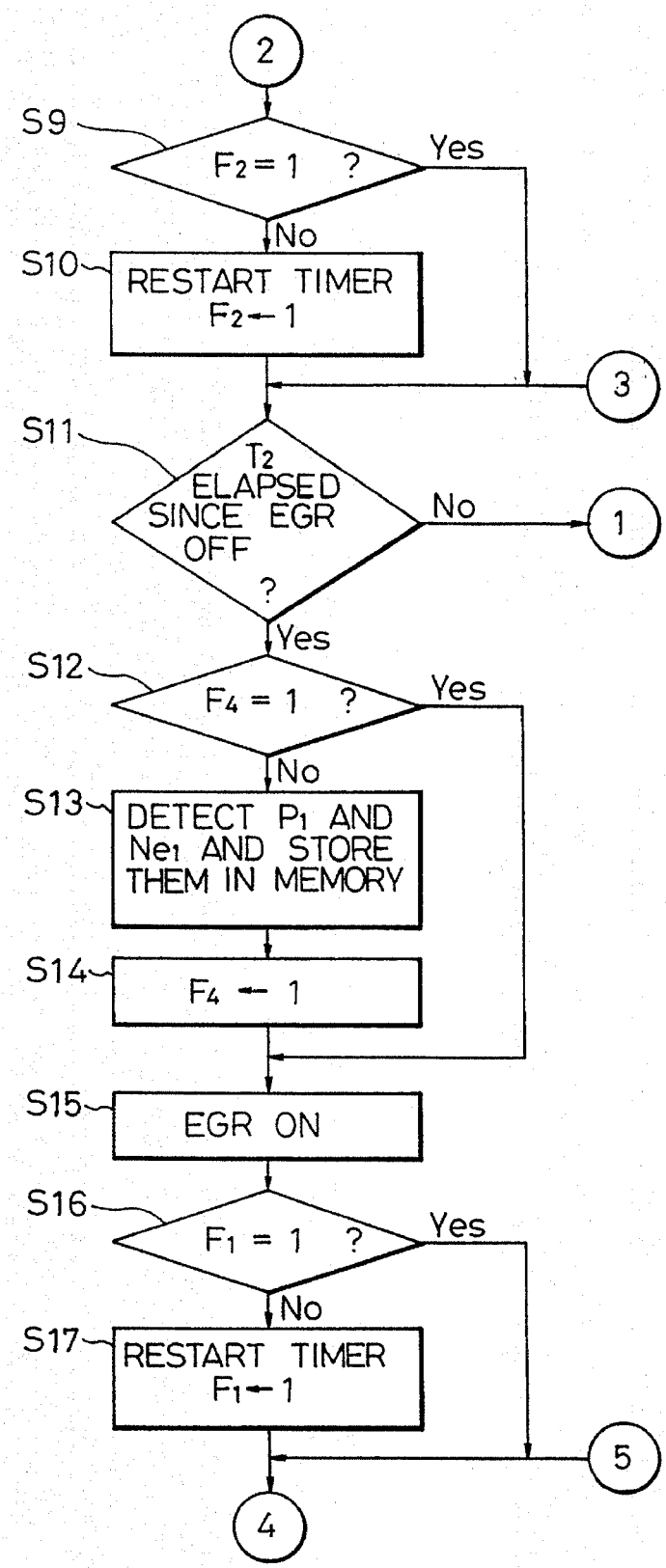
FIG. 8 is a flowchart showing another part, continued from FIG. 7, of the failure determination routine partly shown in FIG. 7.
Figure 9:
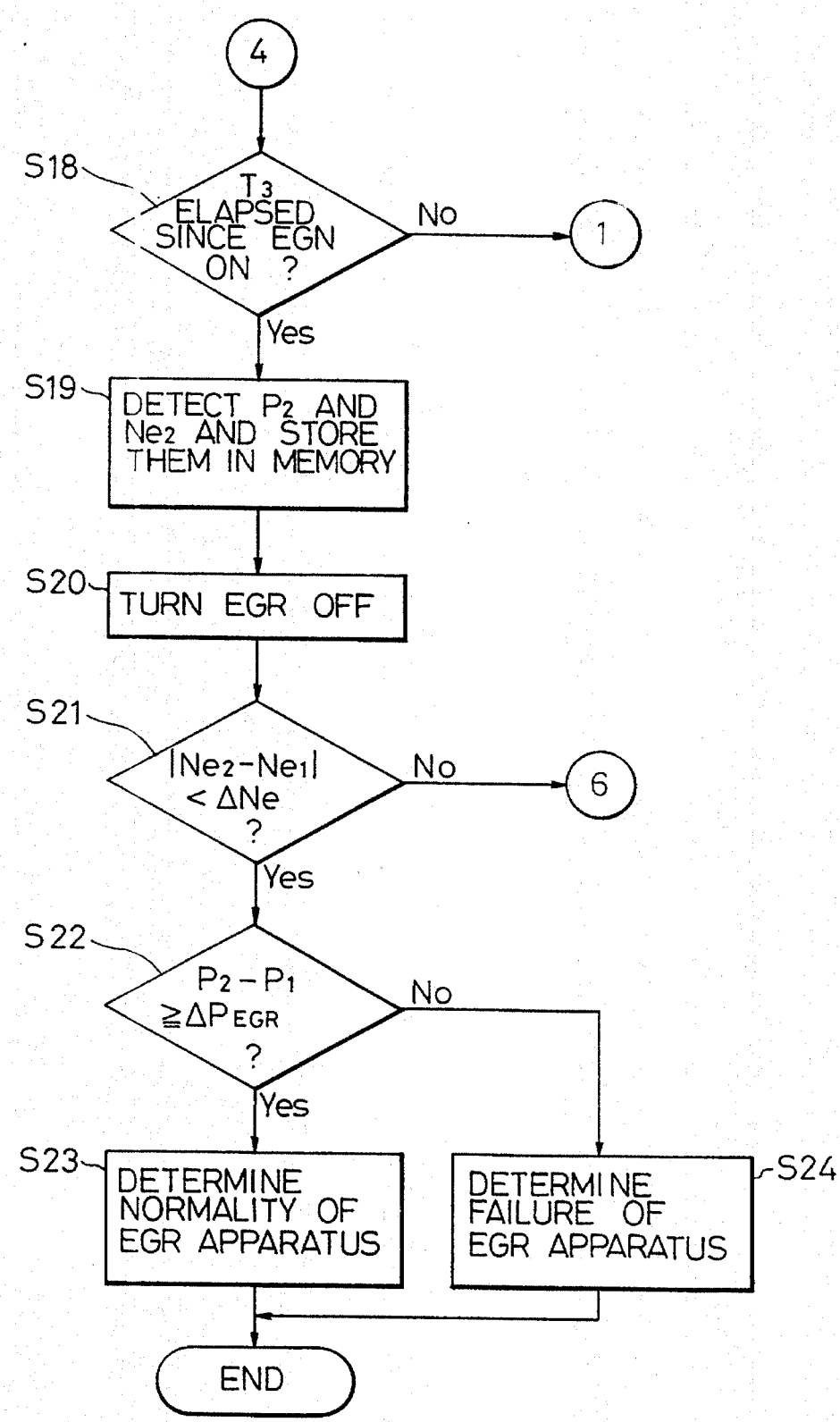
FIG. 9 is a flowchart showing the remaining part, continued from FIG. 8, of the failure determination routine partly shown in FIGS. 7 and 8.

When the engine is started, the electronic control unit 15 starts the failure determination routines shown in FIG. 7 through FIG. 9.

In this failure determination routine, the electronic control unit 15 performs initialization (step S1), to thereby reset to "0" the values of flags $F_1$ through $F_4$ used for selection of a failure determination processing route in accordance with ON and OFF of the EGR, and reset to "0" the measurement time of a timer for measuring an EGR ON time and an EGR OFF time.

Then, in accordance with an output of the engine speed sensor and an output of the idle switch, the control unit 15 determines whether the engine 1 is running in the decelerated operation zone, as the EGR check zone (FIG. 10), wherein the engine speed Ne is equal to or greater than a prescribed speed (e.g., 1300 rpm) higher than the idling speed and the idle switch 16 is turned ON (step S2). If the determination result is negative, then this routine goes back to the step S1.

On the other hand, if it is determined in the step S2 that the engine is running in the EGR check zone, the control unit further determines whether the flag $F_1$ has the value "1" which indicates that the EGR ON time is being measured (step S3). The determination result in the step S3 becomes negative immediately after the EGR check zone is entered. Therefore, the control unit determines whether the flag $F_2$ has the value "1" which indicates that the EGR OFF time is being measured (step S4). This determination result is also negative immediately after the EGR check zone is entered. Thus, the control unit further determines whether the flag $F_3$ has the value "1" which indicates that the time elapsing from the moment of entry into the EGR check zone is being measured (step S5).

Immediately after the entry into the EGR check zone, the flag $F_3$ is still set at the initial value "0" and therefore the determination result in the step S5 is negative. Hence, the control unit 15 starts the timer to begin the measurement of the time elapsing from the moment of the entry into the EGR check zone, and sets the value of the flag $F_3$ to "1" (step S6). Then, the control unit determines whether the measured time is equal to or greater than a specified time $T_1$, which is set to a value long enough to verify that the engine is certainly running in the ECR check zone (step S7). If the determination result is negative, then this routine goes back to the step S2.

After that, as long as the engine is running in the ECR check zone, the steps S2 through S5 and the step S7 are repeatedly implemented. If the control unit determines in the step S7 that the engine has run for the specified time $T_1$ or more in the EGR check zone, then the control unit 15 decides that the engine is certainly running in the EGR check zone, and turns OFF the solenoid of the EGR solenoid valve 10 so as to open the valve 10, thereby causing the EGR valve 9 to close to turn OFF the EGR (step S8). Then, the control unit determines whether the value of the flag $F_2$ is "1" (step S9).

Immediately after the time, which has elapsed from the moment of the entry into the EGR check zone, reaches the specified time $T_1$, the flag $F_2$ is still set at the initial value "0," and therefore, the determination result in the step S9 is negative. In this case, the control unit 15 restarts the timer to begin the measurement of the time elapsing from the moment the EGR is turned OFF, and sets the value of the flag $F_2$ to "1" (step S10). Then, the control unit determines whether the measured time is equal to or greater than a specified time $T_2$ which is long enough to decide that the EGR is OFF (step S11). If the determination result is negative, then this routine goes back to the step S2.

After that, as long as the engine is running in the EGR check zone, the steps S2 through S4 and the step S11 are repeatedly implemented. If the control unit determines in the step S11 that the specified time $T_2$ has elapsed from the moment the EGR was turned OFF, then the control unit 15 decides that the EGR OFF state has been confirmed. If the control unit 15 identifies the EGR OFF state after verifying that the engine is running in the EGR check zone (step S7) in this manner, the control unit determines that the condition for executing the EGR failure determination has been satisfied (FIG. 11A), and then determines whether the flag $F_4$ has the value "1" which indicates the completion of the measurement of the intake manifold pressure $P_1$ and the engine speed $Ne_1$ at the time of the EGR being OFF (step S12).

At the point of time at which the specified time $T_2$ has elapsed, the flag $F_4$ is still set at the initial value "0," and hence the determination result in the step S12 is negative. The control unit 15 reads an output of the pressure sensor and an output of the engine speed sensor, stores the two outputs in the memory as the intake manifold pressure $P_1$ and the engine speed $Ne_1$ obtained when the EGR is OFF (step S18), and sets the value of the flag $F_4$ to "1" (step S14).

Next, the electronic control unit 15 turns ON the solenoid of the EGR solenoid valve 10 to close the valve 10 (FIG. 11B), to thereby open the EGR valve 9 so as to turn the EGR ON (step S15), then determines whether the flag $F_1$ is "1" (step S16).

Immediately after shifting to the EGR ON state, the flag $F_1$ is still set at the initial value "0" and therefore, the determination result in the step S16 is negative. In this case, the control unit 15 restarts the timer to begin the measurement of the time elapsing from the moment the EGR is turned ON, and sets the value of the flag $F_1$ to "1" (step S17). Then, the control unit determines whether the measured time is equal to or greater than a specified time $T_3$ which is long enough to decide that the EGR is ON (step S18). If the determination result is negative, then this routine goes back to the step S2.

After that, as long as the engine is running in the EGR check zone, the steps S2, S3, and S18 are repeatedly implemented. When the control unit determines in the step S18 that the specified time $T_3$ has elapsed from the start of the EGR ON state, the control unit 15 decides that the EGR ON state has been verified, reads the output of the pressure sensor and the output of the engine speed sensor to complete the EGR check, and stores the two outputs in the memory as the intake manifold pressure $P_2$ and the engine speed $Ne_2$ obtained at the end of the EGR check (when the EGR is ON) (step S19). Next, the control unit 15 turns OFF the solenoid of the EGR solenoid valve 10 to open the valve 10, to thereby close the EGR valve 9 so as to turn the EGR OFF (step S20).

Next, the control unit 15 reads the engine speed $Ne_2$ at the end of the EGR check which was stored in the memory In the step S19, and the engine speed $Ne_1$ at the start of the EGR check, which was stored in the memory in the step S13, and determines whether the absolute value $|Ne_2-Ne_1|$ of a difference between the two engine speeds is smaller than a specified value $\Delta Ne$ (step S21). The specified value $\Delta Ne$ signifies a permissible range of engine speed variation which allows the determination of a failure of the EGR apparatus to be performed without making erroneous determination.

If the determination result of the step S21 is negative, then the electronic control unit 15 determines that an erroneous determination may result due to a change in the engine speed if it executes the failure determination on the EGR apparatus, and hence aborts the execution of the failure determination on the EGR apparatus. In this case, the routine goes back to the step S1 for initialization before the processing of the step S2 and after is implemented again.

On the other hand, if the control unit 15 determines in the step S21 that the absolute value $|Ne_2-Ne_1|$ of the difference between the engine speed $Ne_2$ at the end of the EGR check and the engine speed $Ne_1$ at the start of the EGR check is smaller than the specified value $\Delta Ne$, and that there is no danger of erroneous determination caused by a change in the engine speed, then it reads the intake manifold pressure $P_2$ at the end of the EGR check, which was stored in the memory in the step S19, and the intake manifold pressure $P_1$ at the start of the EGR check which was stored in the memory in the step S13, compares the two intake manifold pressure levels to determine a difference $\Delta P$ ($=P_2-P_1$)

between them, and determines whether the difference ΔP (FIG. 11C) is equal to or greater than a failure determination value $\Delta P_{EGR}$ (FIG. 11D) (step S22).

Figure 11:
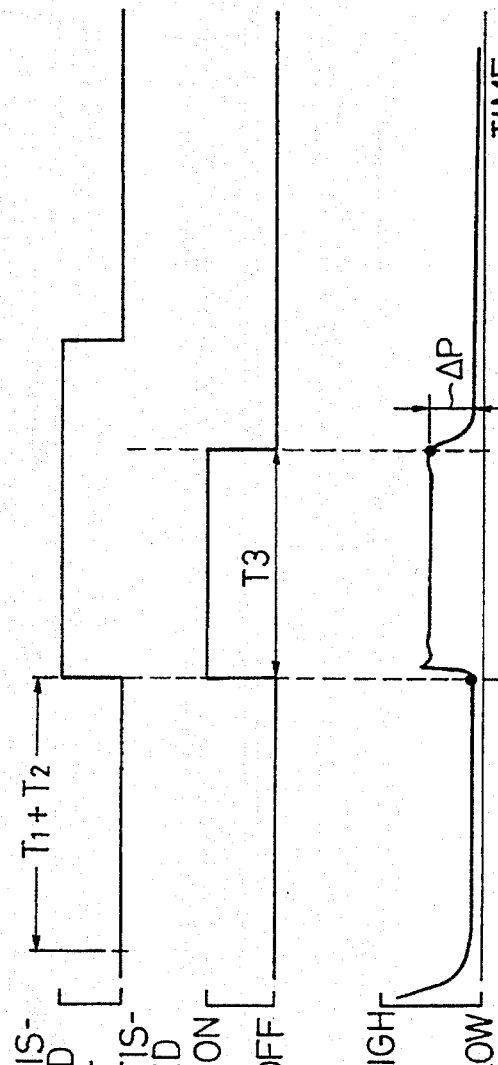

If the determination result of the step S22 is affirmative, that is, it is determined at the step S22 that the difference ΔP between the intake manifold pressure levels at the end and start of the EGR check is equal to or greater than the failure determination value $\Delta P_{EGR}$, the control unit 15 determines that the EGR apparatus is working properly, and causes the EGR check lamp 19 to go OFF (step S23). On the other hand, if the control unit 15 determines that the difference ΔP between the intake manifold pressure levels is below the failure determination value $\Delta P_{EGR}$, as shown in FIG. 11D, then it determines that a failure has occurred in the EGR apparatus (FIG. 11E), and causes the EGR check lamp 19 to come ON (FIG. 11F), to thereby let a driver know that the EGR apparatus has failed.

The following explains the failure determination method according to a second embodiment of the present invention.

The method of this embodiment is similar to the method of the aforementioned first embodiment in that it is designed to remove erroneous failure determination caused by a change in the engine operation state while the failure determination is being carried out, but differs from the first embodiment monitoring a change in the engine speed during the failure determination process as a cause of erroneous determination, in that a change in the fuel supply state during the failure determination process is monitored as a cause of erroneous determination. The failure determination method of this embodiment can be carried out by an EGR apparatus equipped with a failure determination function shown in FIG. 6. Therefore, a detailed explanation of the apparatus will be omitted. This applies also to the below-mentioned embodiments.

In this embodiment, for the purpose of failure determination, the electronic control unit 15, which serves as the failure determination means, temporarily opens and closes the EGR valve 9 to change the EGR amount, and determines whether the EGR apparatus has failed in accordance with the change in the pressure in the surge tank caused by the change of the EGR amount as in the case of the first embodiment. To prevent erroneous determination caused by the change in the fuel supply state during the failure determination process, the failure determination is aborted if the fuel supply states which are detected at the start and end of the failure determination, respectively, are found different.

In relation to the control of the amount of the fuel supplied to the engine 1, the control unit 15, serving as the fuel supply control means, selects, for each cylinder, one of a plurality of control modes set beforehand, and performs a fuel supply control operation in the mode thus selected. When the fuel-cut mode is selected, the supply of the fuel to the engine 1 is interrupted.

The following presents detailed explanation of this failure determination method.

When the engine is started, the failure determination routine, which is basically the same as that shown in FIG. 7 through FIG. 9, is begun. This failure determination routine is different from the routine shown in FIG. 7 through FIG. 9 in the section shown in FIGS. 12 and 13.

In the failure determination routine, as in the case of the first embodiment, the same procedure as that of the step S1 of FIG. 7 through the step S12 of FIG. 8 is implemented in sequence. More specifically, after the flags and the timer are initialized, the EGR is turned OFF when the engine is operated in the EGR check zone for a specified time $T_1$ or longer. Further, when a specified time $T_2$ has elapsed from the moment when the EGR was turned OFF, it is determined in the step S12 of FIG. 8 whether the value of the flag $F_4$ is "1."

At the point of time at which the time $(T_1+T_2)$ has passed from the moment of the entry into the EGR check zone, i.e., at the point where the condition for executing the EGR failure determination has been satisfied, the determination result in the step S12 becomes negative. Hence, the control unit 15 stores the output of the pressure sensor in the memory as the intake manifold pressure $P_1$ obtained at the start of the EGR check (when the EGR is OFF), and determines whether the fuel-cut mode has been selected for one or more cylinders as the then fuel control mode. Further, in accordance with the determination result, the control unit stores a program variable $M_{F1}$, which signifies the fuel control mode at the start of the EGR check, in the memory (step S101 of FIG. 12). The program variable $M_{F1}$ is set to the value "0" if the fuel-cut mode has been selected for one or more cylinders at the start of the EGR check, while it is set to the value "1" if the non-fuel-cut mode has been selected for all the cylinders.

Subsequently, the electronic control unit 15 sets the value of the flag $F_4$ to "1" (step S102), determines whether the fuel-cut mode is selected at the present time, and sets, in accordance with the determination result, a program variable $M_{FS}$ representative of the current fuel control mode in the same manner as for the program variable $M_{F1}$, this program variable being stored in the memory (step S103).

Further, the control unit 15 determines whether the program variables $M_{F1}$ and $M_{F3}$ are the same values (step S104). If the determination result is negative, then the control unit determines that the fuel control mode has changed after the start of the EGR check, and thus aborts the EGR check, to thereby prevent erroneous determination caused by the change in the fuel control mode. In this case, the routine goes back to the step S1 of FIG. 7, and therefore, the EGR check is newly begun after the initialization in this step is completed. On the other hand, if the determination result in the step S104 is affirmative, i.e., if it is determined that the fuel control mode has not changed after the start of the EGR check, the control unit 15 turns ON the solenoid of the EGR solenoid valve 10 to close the valve 10, thereby opening the EGR valve 9 to turn the EGR ON (step S105), and determines whether the flag $F_1$ is "1" (step S106).

Immediately after shifting to the EGR ON state, the determination result in the step S106 is negative, and therefore, the timer is restarted to begin the measurement of the time elapsing from the moment the EGR is turned ON, and the value of the flag $F_1$ is set to "1" (step S107). Then, the control unit determines whether the measured time is equal to or greater than a specified time $T_3$ which is long enough to decide that the EGR is ON (step S108). If the determination result is negative, then this routine goes back to the step S2 of FIG. 7.

Figure 13:
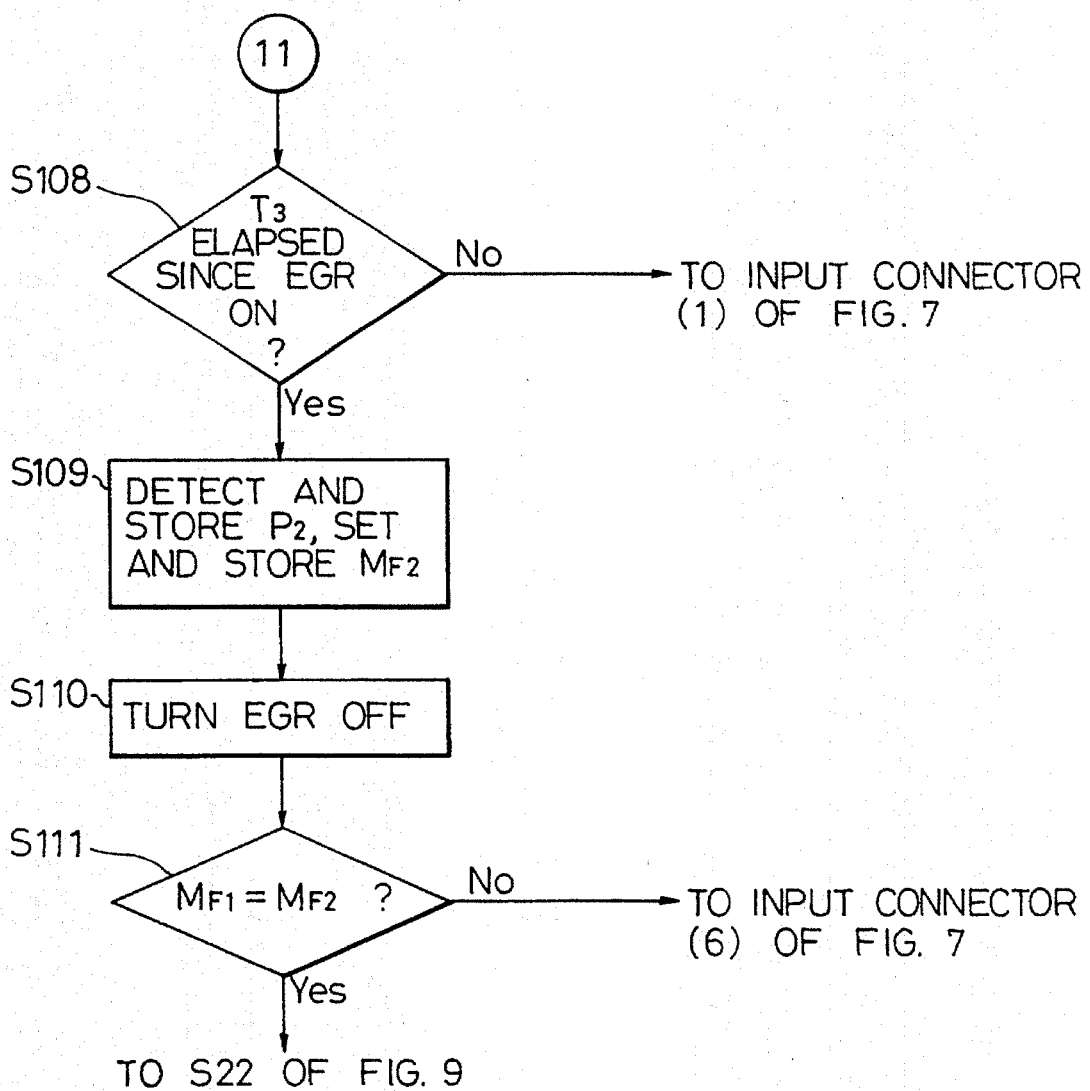
FIG. 13 is a flowchart showing another primary part, continued from FIG. 12, of the failure determination routine partly shown in FIG. 12.

After that, as long as the engine is running in the EGR check zone, the steps S2 and S3 of FIG. 7, and S108 of FIG. 13 are repeatedly implemented. When the control unit determines in the step S108 that the specified time $T_3$ has elapsed from the start of the EGR ON state, the control unit 15 stores the output of the pressure sensor in the memory as the intake manifold pressure $P_2$ obtained at the completion of the EGR check (when the EGR is ON), and determines whether the fuel-cut mode has been selected as the then fuel control mode for one or more cylinders. Further, in accordance with the determination result, the control unit sets a program variable $M_{F2}$, which denotes the fuel control mode at the completion of the EGR check, in the same manner as for the program variables $M_{F1}$ and $M_{F3}$, and stores it in the memory (step S109). Next, the control unit 15 turns OFF the solenoid of the EGR solenoid valve 10 to open the valve 10, to thereby close the EGR valve 9 so as to turn the EGR OFF (step S110).

Then, the control unit 15 reads the program variables $M_{F1}$ and $M_{F2}$, which respectively denote the fuel control modes at the start and end of the EGR check stored in the memory in the steps S101 and S109, respectively, and determines whether the two variable values are identical to each other (step S111).

If the determination result of the step S111 is negative, then the electronic control unit 15 determines that an erroneous determination may result due to a change in the fuel control mode if it executes the failure determination on the EGR apparatus, and therefore it aborts the execution of the failure determination on the EGR apparatus. In this case, the routine goes back to the step S1 of FIG. 1 for initialization before the processing of the step S2 and after is implemented again for another EGR check.

On the other hand, if the control unit 15 determines in the step S111 that the fuel control mode has remained unchanged from the start to the end of the EGR check, and that there is no danger of erroneous determination caused by a change in the fuel control mode, then it determines the difference $\Delta P$ (= $P_2-P_1$) between the intake manifold pressure $P_2$ at the end of the EGR check and the intake manifold pressure $P_1$ at the start of the EGR check, and determines whether the difference $\Delta P$ is equal to or greater than a failure determination value $\Delta P_{EGR}$ (step S22 of FIG. 9).

Subsequently, a failure of the EGR apparatus is determined in accordance with the determination result in the same manner as that for the first embodiment. More specifically, the control unit determines that the EGR apparatus is working properly if the determination result in the step S22 is affirmative, and causes the EGR check lamp 19 to go OFF (step S23). If the control unit 15 determines that the difference $\Delta P$ between the intake manifold pressure levels is below the failure determination value $\Delta P_{EGR}$, then it determines that a failure has occurred in the EGR apparatus, and causes the EGR check lamp 19 to come ON (step S24).

The following describes the failure determination method according to a third embodiment of the present invention.

The method according to this embodiment is similar to the methods according to the first and second embodiments in that it is designed to eliminate failure determination errors caused by a change in the engine operation state that takes place while the failure determination is being carried out, but it differs from the first or second embodiment, wherein a change in the engine speed or in the fuel supply state during the failure determination process is monitored as a cause of erroneous determination, in that a change in the state of secondary air supply via the ISC valve during the failure determination process is monitored as a cause of erroneous determination.

In this embodiment, for the purpose of failure determination, the electronic control unit 15, which serves as the failure determination means, temporarily opens and closes the EGR valve 9 to change the EGR amount, and determines whether the EGR apparatus has a failure in dependence on a change in the pressure in the surge tank which is caused by the change of the EGR amount, as in the case of the first and second embodiments. To prevent erroneous determination caused by the change in the secondary air supply state during the failure determination process, the failure determination is aborted if the difference between the ISC valve opening degrees detected at the start and the end of the failure determination, respectively, is found to be significant.

The following presents detailed explanation of this failure determination method.

When the engine is started, the failure determination routine, which is basically the same as that shown in FIG. 7 through FIG. 9, is begun. This failure determination routine is different from the routine shown in FIG. 7 through FIG. 9 in the section shown in FIG. 14.

In the failure determination routine, as in the case of the first and second embodiments, the same procedure as that of the step S1 of FIG. 7 through the step S12 of FIG. 8 is implemented in sequence. More specifically, after the flags and the timer are initialized, when the engine is operated in the EGR check zone for the specified time $T_1$ or longer, the EGR is turned OFF. When the specified time $T_2$ has elapsed from the moment the EGR was turned OFF, it is determined in the step S12 of FIG. 8 whether the value of the flag $F_4$ is "1."

At the time point where the specified time $T_2$ has elapsed, the determination result is negative. In this case, the control unit 15 stores in the memory the output of the pressure sensor as the intake manifold pressure $P_1$ obtained when the EGR is OFF, and stores in the memory an ISC valve opening degree $\theta_1$ obtained when the EGR is OFF, which opening degree is determined by referring to a control output applied to the stepping motor for driving the ISC valve 5 (step S201 of FIG. 14). The control unit then sets the value of the flag $F_4$ to "1" (step S202).

Figure 14:
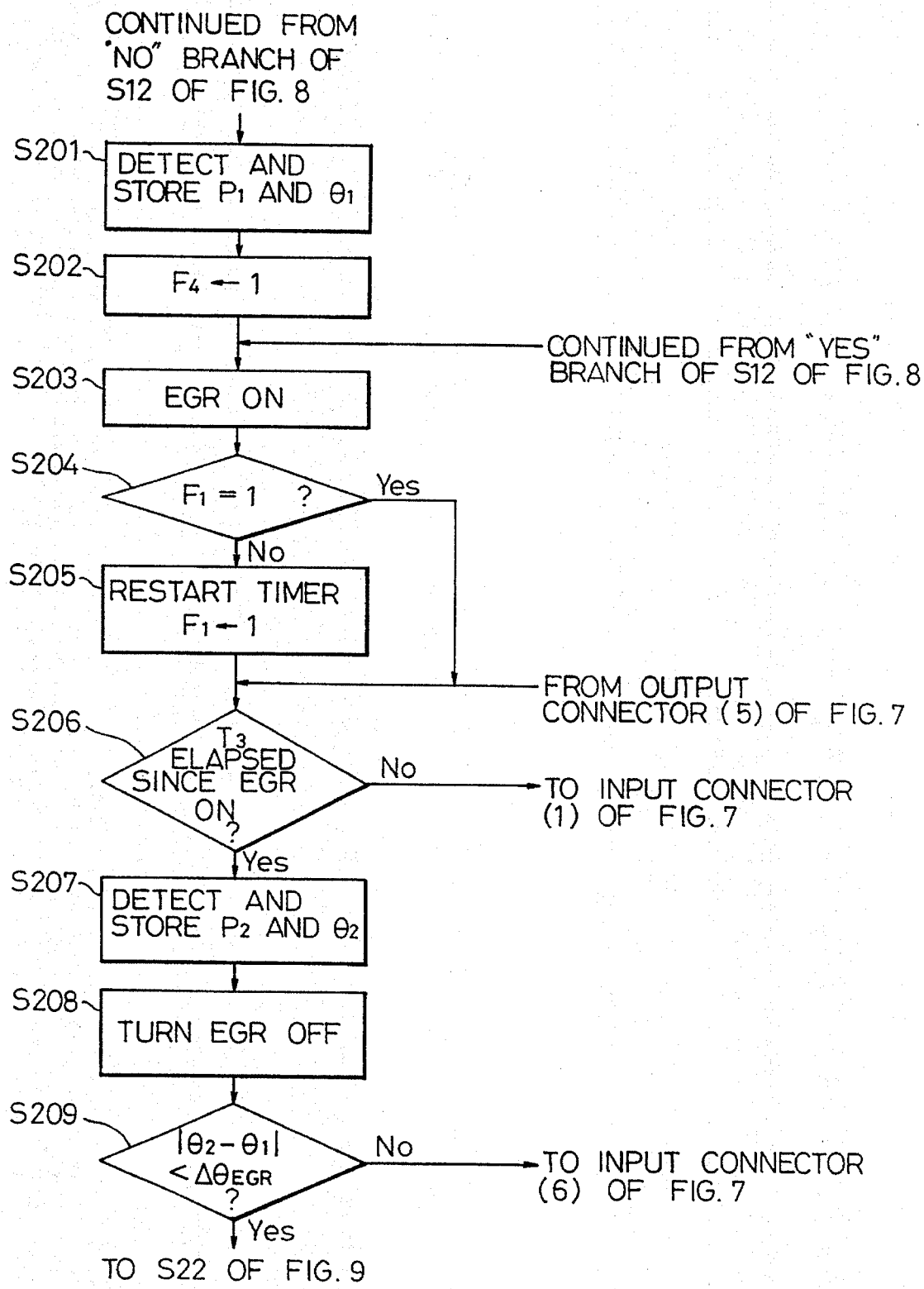
FIG. 14 is a flowchart showing a primary part, continued from the step S12 of FIG. 8, of the failure determination routine carried out in the failure determination of a third embodiment of the present invention.

Subsequently, as in the case of the first embodiment, the control unit 15 executes in sequence the steps S203 through S206 of FIG. 14 which correspond to the steps S15 through S17 of FIG. 8 and the step S18 of FIG. 9. More specifically, the control unit 15 opens the EGR valve 9 to turn the EGR ON (step S203), determines that the flag $F_1$ is not "1" (step S204), restarts the timer to begin the measurement of the time elapsing from the moment the EGR is turned ON, sets the value of the flag $F_1$ to "1" (step S205), and further determines that the measured time, which indicates the time elapsed from the moment the EGR was turned ON, does not exceed the specified time $T_3$ (step S206). After that, as long as the engine is running in the EGR check zone, the steps S2 and S3 of FIG. 7 and the step S206 of FIG. 14 are repeatedly implemented.

If the control unit 15 determines in the step S206 that the specified time $T_3$ has elapsed from the moment the EGR was turned ON, then it stores in the memory the output of the pressure sensor as the intake manifold pressure $P_2$ obtained at the end of the EGR check (when the EGR is ON), determines an ISC valve opening degree $\theta_2$ obtained at the end of the EGR check, and stores it in the memory (step S207). Then, the control unit causes the EGR valve 9 to close, to thereby turn the EGR OFF (step S208).

Next, the control unit 15 reads from the memory the ISC valve opening degree $\theta_2$ obtained at the end of the EGR check and the ISC valve opening degree $\theta_1$ at the start of the EGR check, and determines whether the absolute value $|\theta_2-\theta_1|$ of the difference between the two valve opening degrees is smaller than a determination value a $\Delta\theta_{EGR}$ (step S209). The determination value $\Delta\theta_{EGR}$ signifies a permissible range of ISC valve opening degree variation which allows the determination of a failure of the EGR apparatus to be performed without making erroneous determination.

If the determination result of the step S209 is negative, then the electronic control unit 15 determines that an erroneous determination may result due to a change in the secondary air supply state caused by a change in the ISC valve opening degree if it executes the failure determination on the EGR apparatus, and hence aborts the execution of the failure determination on the EGR apparatus. In this case, the routine goes back to the step S1 of FIG. 7 for initialization before the processing of the step S2 and after is implemented again.

On the other hand, if the control unit 15 determines in the step S209 that the absolute value $|\theta_2-\theta_1|$ of the difference between the ISC valve opening degree $\theta_2$ at the end of the EGR check and the ISC valve opening degree $\theta_1$ at the start of the EGR check is smaller than the determination value $\Delta\theta_{EGR}$, and therefore there is no danger of erroneous determination caused by a change in the secondary air supply state, then the control unit determines the difference $\Delta P$ $(=P_2-P_1)$ between the intake manifold pressure $P_2$ at the end of the EGR check and the intake manifold pressure $P_1$ at the start of the EGR check, and determines whether the difference $\Delta P$ is equal to or greater than the failure determination value $\Delta P_{EGR}$ (step S22 of FIG. 9).

As in the case of the first and second embodiments, if the determination result in the step S22 is affirmative, then the control unit determines that the EGR apparatus is working properly, and hence causes the EGR check lamp 19 to go OFF (step S23). If the determination result is negative, then the control unit determines that the EGR apparatus has failed, and causes the EGR check lamp 19 to come ON (step S24).

The following explains the failure determination method according to a fourth embodiment of the present invention.

The method according to this embodiment is similar to the method according to the first through third embodiments in that it is designed to remove failure determination errors caused by a change in the engine operation state which takes place while the failure determination is being carried out, but it differs from the first, second or third embodiment, wherein the failure determination is aborted if a change takes place in the engine operation state (engine speed, fuel supply state or secondary air supply state), in that the failure determination is carried out in accordance with a variation of the intake manifold pressure, which has been corrected according to the variation of the engine speed, even if the engine speed indicative of an engine operation state changes.

In this failure determination method, when the engine is started, the failure determination routine, which is basically the same as that shown in FIG. 7 through FIG. 9, is begun. This failure determination routine is different from the routine shown in FIG. 7 through FIG. 9 in the section shown in FIG. 15.

In the failure determination routine, as in the case of the first embodiment, the same procedure as that of the step S1 of FIG. 7 through the step S20 of FIG. 8 is implemented in sequence. More specifically, after the flags and the timer are initialized, when the engine has been operated in the EGR check zone for the specified time $T_1$ or longer, the EGR is turned OFF. At the EGR check start point at which the specified time $T_2$ has elapsed from the moment the EGR was turned OFF, the intake manifold pressure $P_1$ and the engine speed $Ne_1$ are detected, and the EGR is turned ON. Furthermore, at the EGR check end point at which the specified time $T_3$ has elapsed from the moment the EGR was turned ON, the intake manifold pressure $P_2$ and the engine speed $Ne_2$ are detected, and the EGR is turned OFF (step S20 of FIG. 9).

Figure 15:
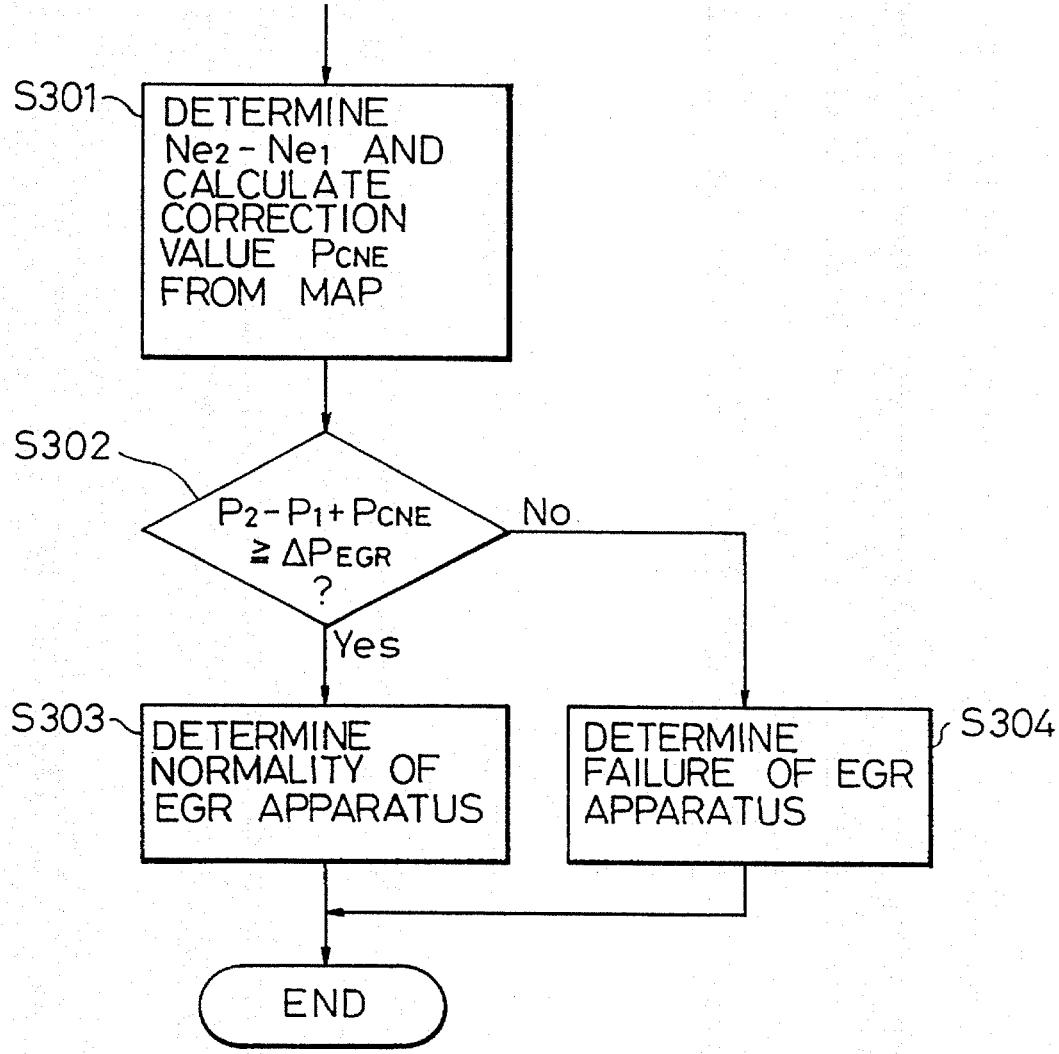
FIG. 15 is a flowchart showing a primary part, continued from step S20 of FIG. 9, of the failure determination routine carried out in the failure determination of a fourth embodiment of the present invention.
Figure 16:
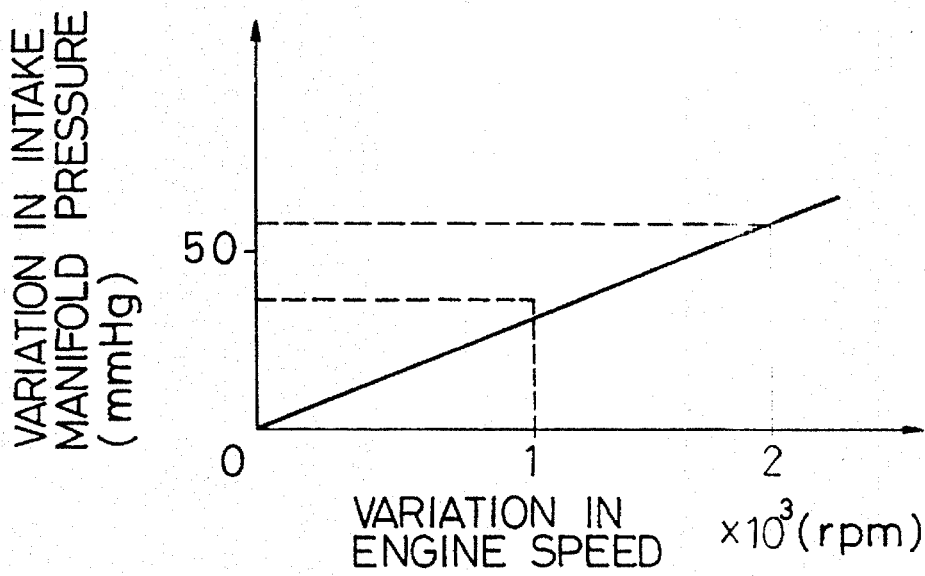
FIG. 16 is a graph showing a relationship between engine speed variation and intake manifold pressure variation.
Figure 17:
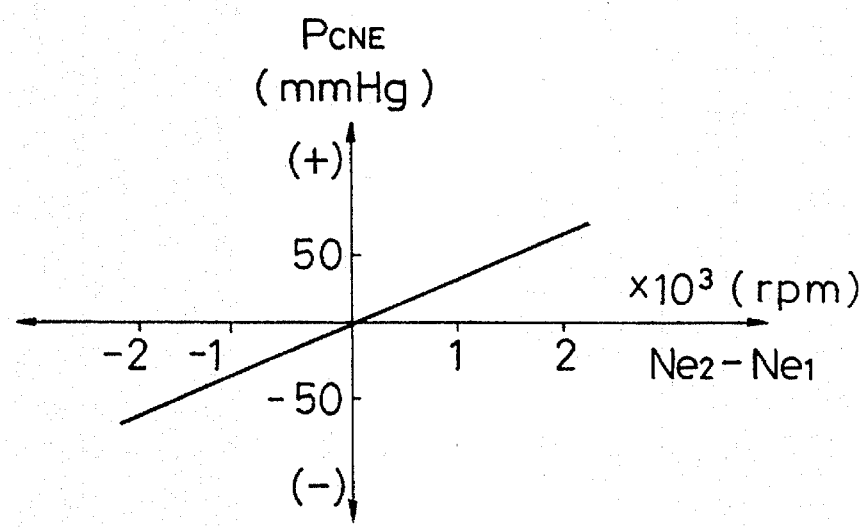
FIG. 17 is a graph illustrating an engine speed difference vs. correction value map which is used in the failure determination routine shown in FIG. 15.

In a step S301 of FIG. 15 following the step S20, the electronic control unit 15 determines the difference between the engine speed $Ne_2$ at the end of the EGR check and the engine speed $Ne_1$ at the start of the EGR check, and, based on the difference $(Ne_2-Ne_1)$, the control unit calculates a correction value $P_{CNE}$ according to the difference between the engine speeds $(Ne_2-Ne_1)$ from an $(Ne_2-Ne_1)$ vs. $P_{CNE}$ map shown in FIG. 17. As shown in FIG. 16, the variation of the engine speed is approximately proportional to the variation of the intake manifold pressure. The aforesaid map is set beforehand in accordance with this proportional relationship and stored in the memory.

Next, the control unit 15 determines the difference $\Delta P$ $(=P_2-P_1)$ between the intake manifold pressure $P_2$ at the end of the EGR check and the intake manifold pressure $P_1$ at the start of the EGR check, and adds the correction value $P_{CNE}$ determined in the step S301 to the difference $\Delta P$, thereby determining a corrected difference between the intake manifold pressures $(P_2-P_1+P_{CNE})$ (step S302).

Making such a correction eliminates the influences exerted by a change, which takes place in the engine speed during the EGR check, on the intake manifold pressure and the intake manifold pressure difference $\Delta P$.

Figure 18:
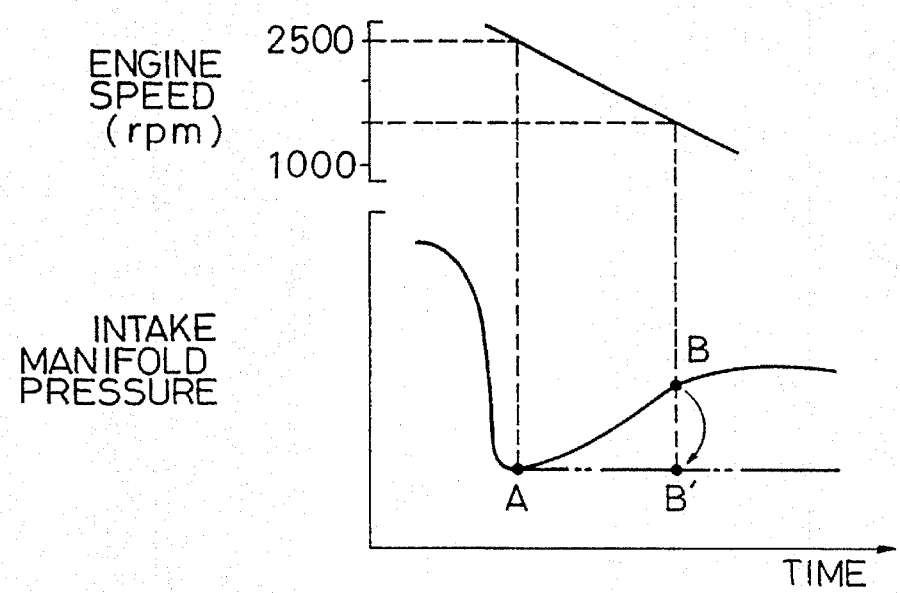
FIG. 18 is a graph showing changes in the intake manifold pressure caused by a drop in the engine speed during the failure determination, and corrections for compensating such changes.

For instance, as shown in FIG. 18, if the engine speed drops from 2500 rpm to 1500 rpm during the period from the start of the EGR check to the end of the EGR check, then the intake manifold pressure increases accordingly from point A to point B on the solid line shown in FIG. 18. On the other hand, if such a drop In the engine speed results in a negative engine speed difference $(Ne_2-Ne_1)$, then the correction value $P_{CNE}$ is set to a negative value (FIG. 17). Hence, in the case of FIG. 18, the intake manifold pressure difference is decreased for correction by using the correction value $P_{CNE}$ which corresponds to the 1000 rpm drop in the engine speed, thereby removing the influence exerted by the drop in the engine speed on the pressure difference $\Delta P$. In other words, the correction of the pressure difference made by using the correction value $P_{CNE}$ causes the intake manifold pressure at the completion of the EGR check to be decreasingly corrected from point B on the solid line to point B' on the two-dot chain line of FIG. 18. As a result, the increase in the intake manifold pressure caused by the drop in the engine speed is corrected by the correction of the pressure difference, so that the intake manifold pressure at the completion of the EGR check is corrected to point B' (if the EGR apparatus is faulty).

Figure 10:
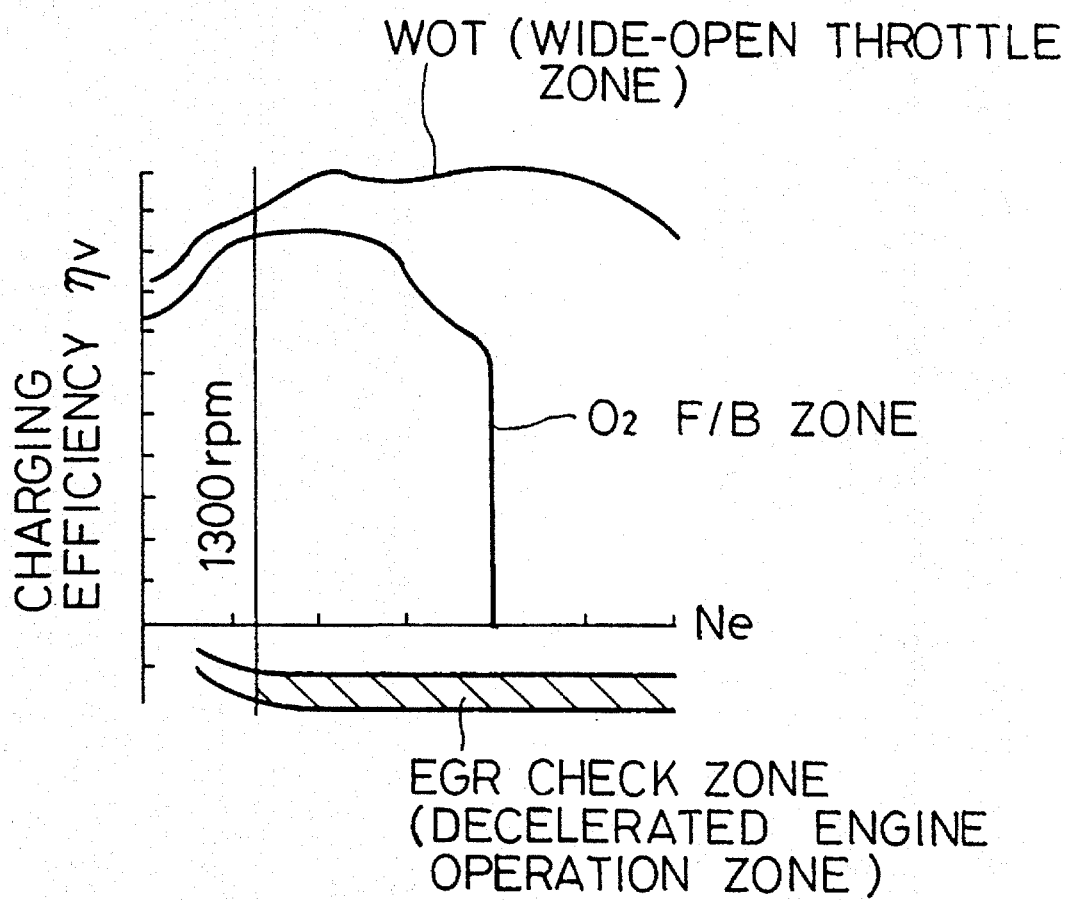
FIG. 10 is a graph showing the EGR check zone (decelerated engine operation zone) in the first embodiment of the present invention, with charging efficiency $\eta v$ taken on the ordinate and engine speed Ne taken on the abscissa, together with other engine operation zones.
Figure 19:
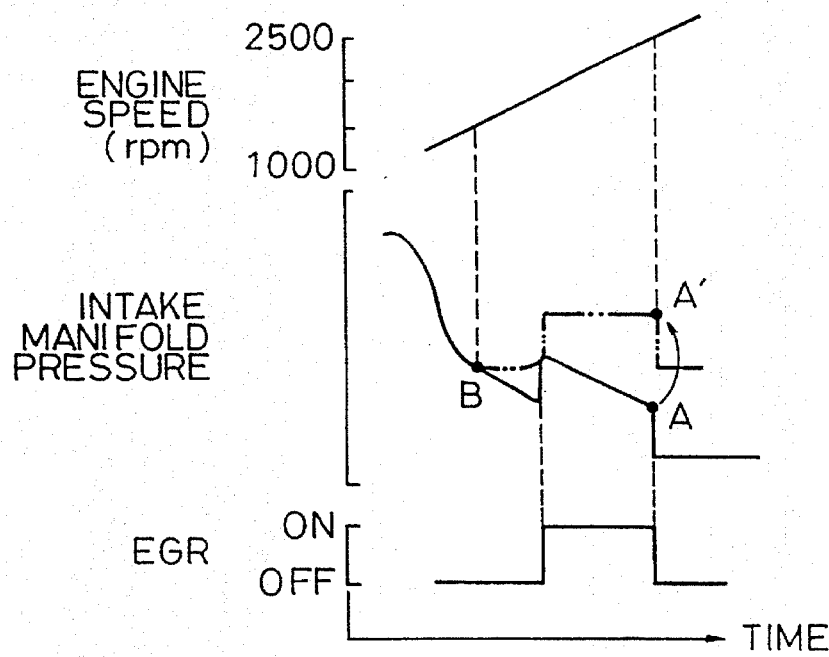
FIG. 19 is a graph showing changes in the intake manifold pressure caused by a rise in the engine speed during the failure determination, and corrections for compensating such changes.

As shown in FIG. 10, if the engine speed rises from 1500 rpm to 2500 rpm during the period from the start of the EGR check to the end of the EGR check, then the intake manifold pressure drops accordingly from point B to point A on the solid line shown in FIG. 19. On the other hand, if such a rise in the engine speed results in a positive engine speed difference, then the correction value $P_{CNE}$ is set to a positive value. Hence, in the case of FIG. 19, the intake manifold pressure difference is increased for correction by using the correction value $P_{CNE}$ which corresponds to the 1000 rpm rise in the engine speed, thereby removing the influence exerted by the rise in the engine speed on the pressure difference $\Delta P$. In other words, the correction of the pressure difference made by using the correction value $P_{CNE}$ causes the intake manifold pressure at the end of the EGR check to be increasingly corrected from point A on the solid line to point A' on the two-dot chain line of FIG. 19. As a result, the decrease in the intake manifold pressure caused by the rise in the engine speed is corrected by the correction of the pressure difference so that the intake manifold pressure at the end of the EGR check is corrected to point A'.

In a step S302, the electronic control unit 15 determines whether the intake manifold pressure difference $(P_2-P_1+$ $P_{CNE}$), which has been corrected in accordance with the difference between the engine speed at the start of the EGR check and the engine speed at the end of the EGR check, is equal to or greater than the failure determination value $\Delta P_{EGR}$. If the determination result is affirmative, then the control unit determines that the EGR apparatus is working properly (step S303). If the determination result is negative, then the control unit determines that the EGR has failed, and causes the EGR check lamp 19 to come ON (step S304).

The following explains the failure determination method according to a fifth embodiment of the present invention.

The method according to this embodiment is similar to that of the fourth embodiment in that, even if the engine operation state changes during the EGR check, the failure determination is carried out in accordance with the variation of the intake manifold pressure, which has been corrected in accordance with the change in the engine operation state, but it differs from that of the fourth embodiment, wherein the correction is made based on the variation of the engine speed, in that the correction is made based on the variation of the ISC valve opening degree during the EGR check. Further, the method of this embodiment is similar to the method of the third embodiment in that the variation of the ISC valve opening degree during the EGR check is detected.

In the failure determination routine, when the engine is started, the failure determination routine, which is basically the same as that shown in FIGS. 14 and 15 is begun. This failure determination routine differs from the routine of FIGS. 14 and 15 in a section shown in FIG. 20.

In this failure determination routine, the same steps as those of the step S1 of FIG. 7 through the step S12 of FIG. 8 and the steps S201 through S208 of FIG. 14 are implemented in sequence. More specifically, after the flags and the timer are initialized, when the engine is operated in the EGR check zone for the specified time $T_1$ or longer, the EGR is turned OFF. At the EGR check start point at which the specified time $T_2$ has elapsed from the moment the EGR was turned OFF, the intake manifold pressure $P_1$ and the ISC valve opening degree $\theta_1$ are detected, and the EGR is turned ON. Furthermore, at the EGR check end point at which the specified time $T_3$ has elapsed from the moment the EGR was turned ON, the intake manifold pressure $P_2$ and the ISC valve opening degree $\theta_2$ are detected, and the EGR is turned OFF.

Figure 21:
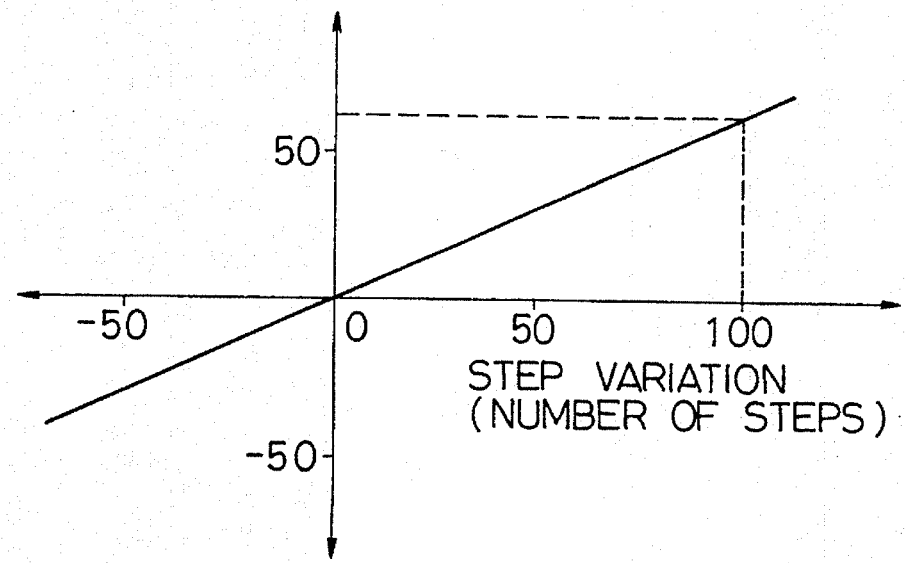
FIG. 21 is a graph showing a relationship between step variation of the ISC valve and intake manifold pressure variation.
Figure 22:
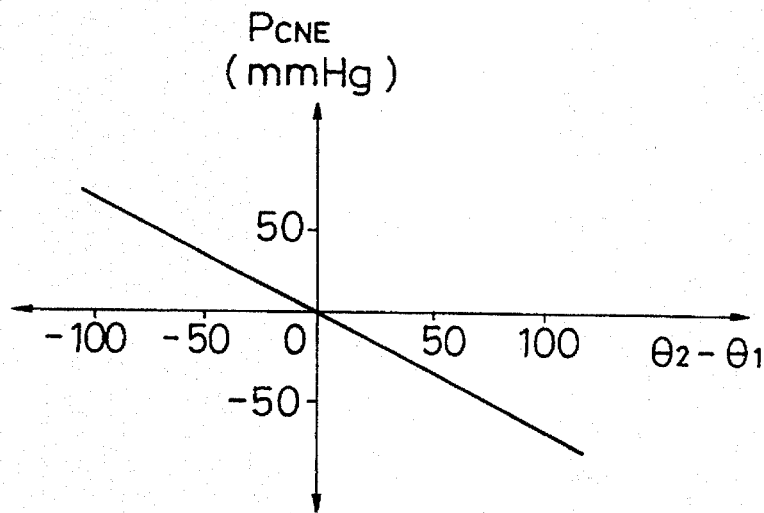
FIG. 22 is a graph illustrating an ISC valve opening degree variation vs. correction value map which is used in the failure determination routine shown in FIG. 21.

In a step S401 of FIG. 20 following the step S208 of FIG. 14, the electronic control unit 15 determines the difference between the ISC valve opening degree $\theta_2$ at the end of the EGR check and the ISC valve opening degree $\theta_1$ at the start of the EGR check, and, based on the difference $(\theta_2-\theta_1)$, the control unit calculates the correction value $P_{CNE}$ according to the difference between the ISC valve opening degrees $(\theta_2-\theta_1)$ from a $(\theta_2-\theta_1)$ vs. $P_{CNE}$ map shown In FIG. 22. As shown in FIG. 21, the variation of the step of the ISC valve 5 (the number of steps of the stepping motor) is approximately proportional to the variation of the intake manifold pressure. The aforesaid map is set beforehand in accordance with this proportional relationship and stored in the memory.

Next, as in the case of the fourth embodiment, the control unit 15 adds the correction value $P_{CNE}$ determined in the step S401 to the difference $\Delta P$ between the intake manifold pressure $P_2$ at the end of the EGR check and the intake manifold pressure $P_1$ at the start of the EGR check, thereby determining a corrected difference between the intake manifold pressures $(P_2-P_1+P_{CNE})$ (step S302).

Making such a correction eliminates the influences exerted by a change in the amount of the secondary air due to a change in the ISC valve opening degree which occurs during the EGR check on the intake manifold pressure and the intake manifold pressure difference $\Delta P$.

Figure 23:
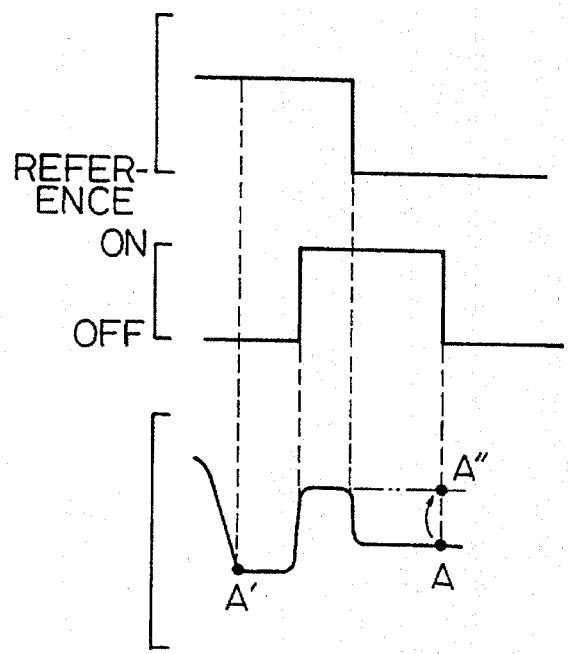
FIG. 23 is a graph showing changes in the intake manifold pressure caused by decreases in the ISC valve opening degree during the failure determination, and corrections for compensating such changes.

For instance, as shown in FIG. 23, if the ISC valve opening degree, which was set to a larger value than a reference opening degree at the start of the EGR check, decreases to the reference opening degree during the EGR check, then the intake manifold pressure increases accordingly from point A' on the solid line to point A" on the two-dot chain line shown in FIG. 23 because of the EGR ON state. Then, the intake manifold pressure decreases from that level to point A on the solid line as the ISC valve opening degree decreases. On the other hand, if such a decrease in the valve opening degree results in a negative valve opening degree difference $(\theta_2-\theta_1)$, then the correction value $P_{CNE}$ is set to a positive value (FIG. 22). Hence, in the case of FIG. 23, the intake manifold pressure difference is increased for correction by using the correction value $P_{CNE}$ which corresponds In magnitude to the decrease in the ISC valve opening degree, thereby removing the influence exerted by the decrease in the ISC valve opening degree on the pressure difference $\Delta P$. In other words, the pressure difference correction made by using the correction value $P_{CNE}$ causes the intake manifold pressure at the end of the EGR check to be increasingly corrected from point A on the solid line to point A" on the two-dotted chain line.

Figure 24:
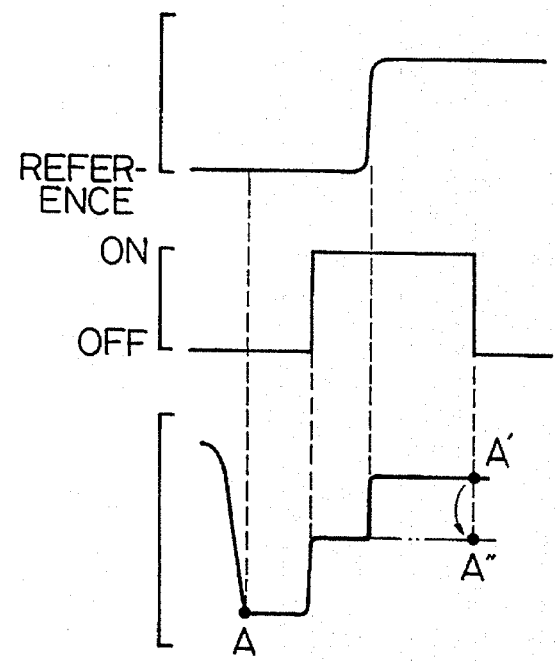
FIG. 24 is a graph showing changes in the intake manifold pressure caused by increases in the ISC valve opening degree during the failure determination, and corrections for compensating such changes.

As shown in FIG. 24, if the ISC valve opening degree, which was set to the reference opening degree at the start of the EGR check, increasingly changes to an opening degree greater than the reference opening degree during the EGR check, the intake manifold pressure increases accordingly from point A to point A' on the solid line shown in FIG. 24 because of the increase in the opening degree of the ISC valve. On the other hand, if such an increase in the valve opening degree results in a positive valve opening degree difference $(\theta_2-\theta_1)$, the correction value $P_{CNE}$ is set to a negative value (FIG. 22). Hence, in the case of FIG. 24, the intake manifold pressure difference is decreasingly corrected by the correction value $P_{CNE}$ which corresponds in magnitude to the increase in the ISC valve opening degree, thereby removing the influence exerted by the increase in the ISC valve opening degree on the pressure difference $\Delta P$. In other words, the pressure difference correction made by the correction value $P_{CNE}$ causes the intake manifold pressure at the end of the EGR check to be decreasingly corrected from point A' on the solid line to point A" on the two-dot chain line of FIG. 24.

In a step S402, the electronic control unit 15 determines whether the difference between the intake manifold pressures $(P_2-P_1+P_{CNE})$, which has been corrected in accordance with the difference between the ISC valve opening degree at the start of the EGR check and the ISC valve opening degree at the end of the EGR check, is equal to or greater than the failure determination value $\Delta P_{EGR}$. If the determination result is affirmative, then the control unit determines that the EGR apparatus is working properly (step S403). If the determination result is negative, then the control unit determines that the EGR has failed, and hence causes the EGR check lamp 19 to come ON (step S404). The corrected intake manifold pressure difference is used for the failure determination to remove the influences exerted by a change in the ISC valve opening degree on the pressure difference $\Delta P$, and therefore, the possibility of erroneous determination is eliminated.

The following explains the failure determination method according to a sixth embodiment of the present invention.

The method of this embodiment is similar to those of the first through fifth embodiments described above in that the failure determination is implemented in accordance with the variation of the intake manifold pressure during the EGR check, but differs from these embodiments in that a change in the ISC valve opening degree (a change in the engine operation state in a broad sense), which exerts influences on the change in the intake manifold pressure during the EGR check, is prohibited.

In this failure determination method, when the engine is started, the failure determination routine, which is basically the same as that shown in FIG. 7 through FIG. 9, is begun.

In this failure determination routine, as in the case of the first embodiment, the same steps as those of the step S1 of FIG. 7 through the step S11 of FIG. 8 are implemented in sequence. More specifically, after the flags and the timer are initialized, when the engine is operated in the EGR check zone for the specified time $T_1$ or longer, the EGR is turned OFF. Then, when the EGR check start point is reached after the specified time $T_2$ has elapsed from the moment the EGR was turned OFF, the control unit determines in the step S12 of FIG. 8 whether the flag $F_4$ is the value "1" which indicates the completion of the measurement at the EGR check start point.

Figure 25:
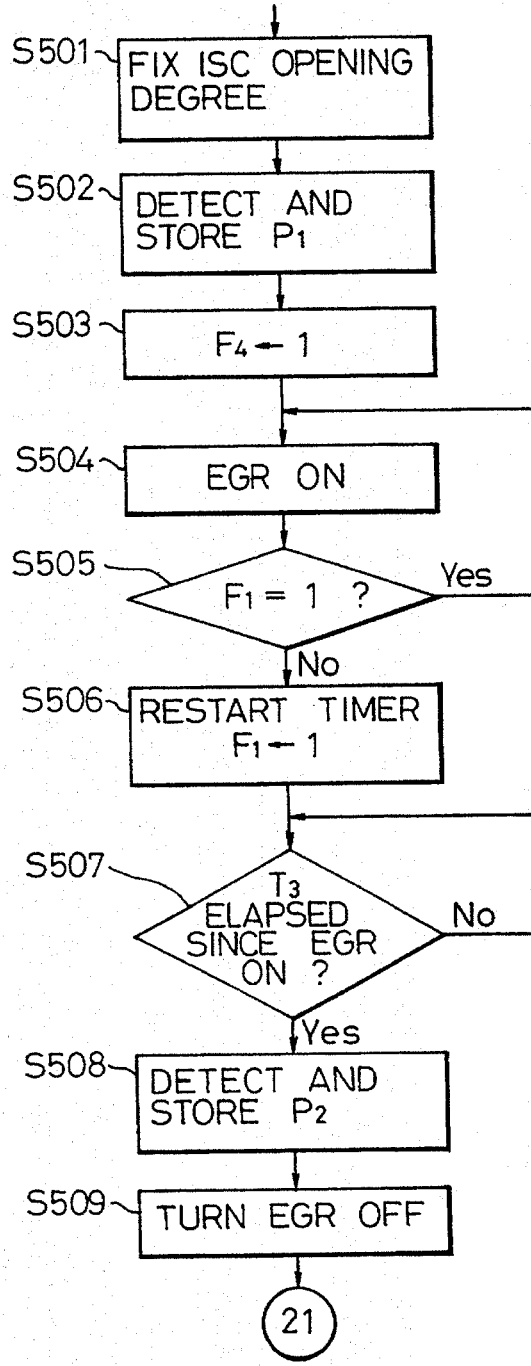
FIG. 25 is a flowchart showing part, continued from step S12 of FIG. 8, of the failure determination routine carried out in the failure determination of a sixth embodiment of the present invention.

If the electronic control unit 15 determines in the step S12 that the measurement at the EGR check start point has not been completed, it fixes a control output delivered at the present time to the stepping motor for driving the ISC valve 5 (step S501 of FIG. 25), detects the output of the pressure sensor as the intake manifold pressure $P_1$ at the EGR check start point, and stores the sensor output in the memory (step S502).

Subsequently, steps S503 through S507 respectively corresponding to the steps S14 through S18 of FIG. 8 are executed in sequence, to thereby cause the EGR to be turned ON. Thereafter, the EGR ON state is maintained until the specified time $T_3$ (e.g., 1 second) elapses from the moment the EGR is turned ON. At the point of the completion of the EGR check, where the specified time $T_3$ has elapsed, the intake manifold pressure $P_2$ is detected and stored (step S508), and the EGR is turned OFF (step S509).

Figure 26:
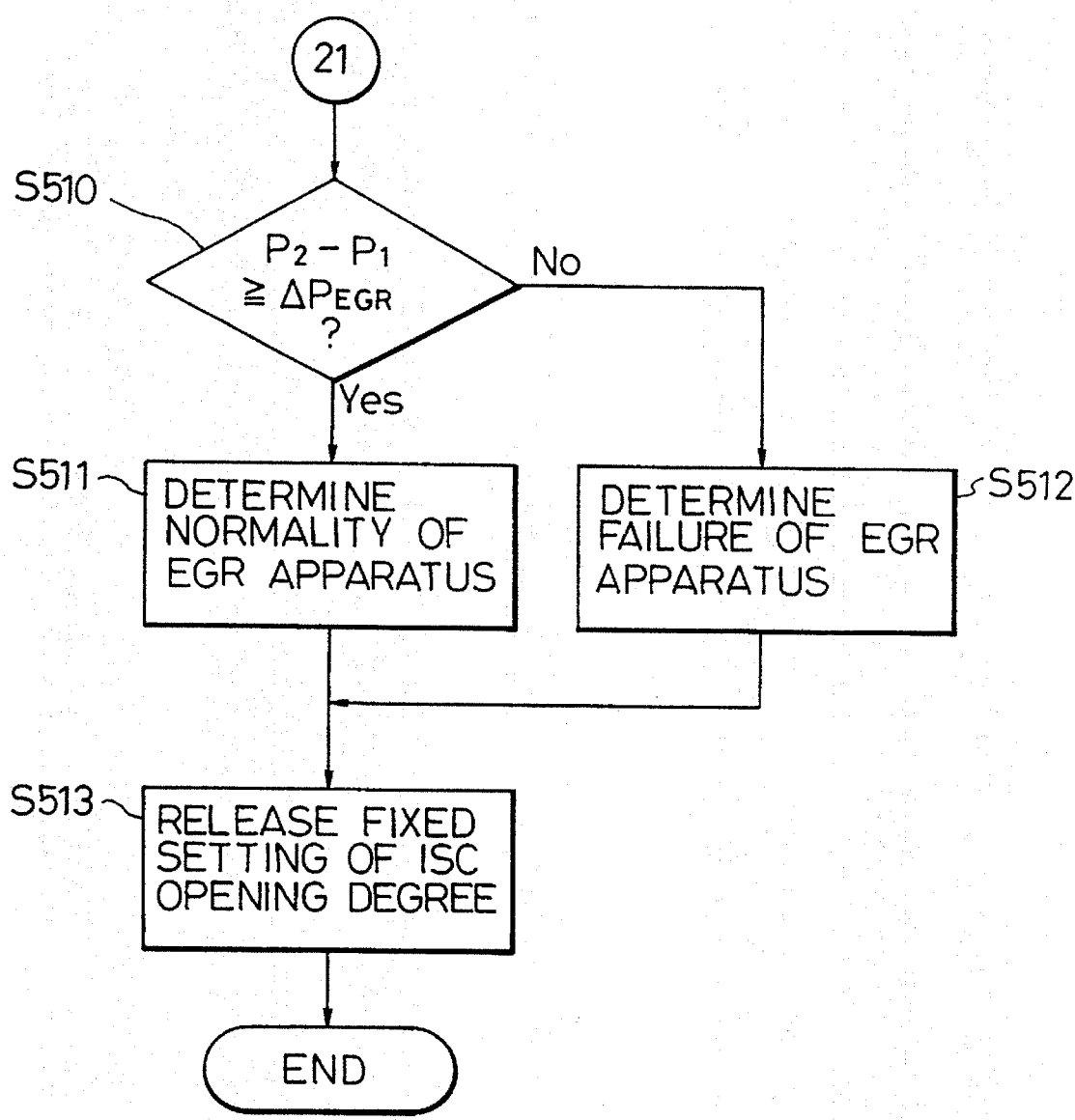
FIG. 26 is a flowchart showing another part, continued from FIG. 25, of the failure determination routine partly shown in FIG. 25.

Furthermore, as in the cases of the aforesaid embodiments, the control unit determines that the EGR apparatus is normal if the difference $\Delta P$ ($=P_2-P_1$) between the intake manifold pressure $P_2$ at the end of the EGR check and the intake manifold pressure $P_1$ at the start of the EGR check is equal to or greater than the failure determination value $\Delta P_{EGR}$; while it determines that the EGR apparatus has failed if the pressure difference $\Delta P$ is below the failure determination value $\Delta P_{EGR}$ (steps S510 through S512 of FIG. 26). In a step S513 following the failure determination step S511 or S512, the control unit releases the fixed setting of the ISC valve opening degree before it terminates the failure determination routine.

In this manner, the ISC valve opening degree is held during the EGR check, whereby the amount of the secondary air supplied to the engine 1 via the bypass passage 4 is prevented from changing. As a result, there occurs no erroneous failure determination caused by a change in the amount of the secondary air.

The present invention is not limited to the first through sixth embodiments described above, but may be modified in various manners.

Figure 12:
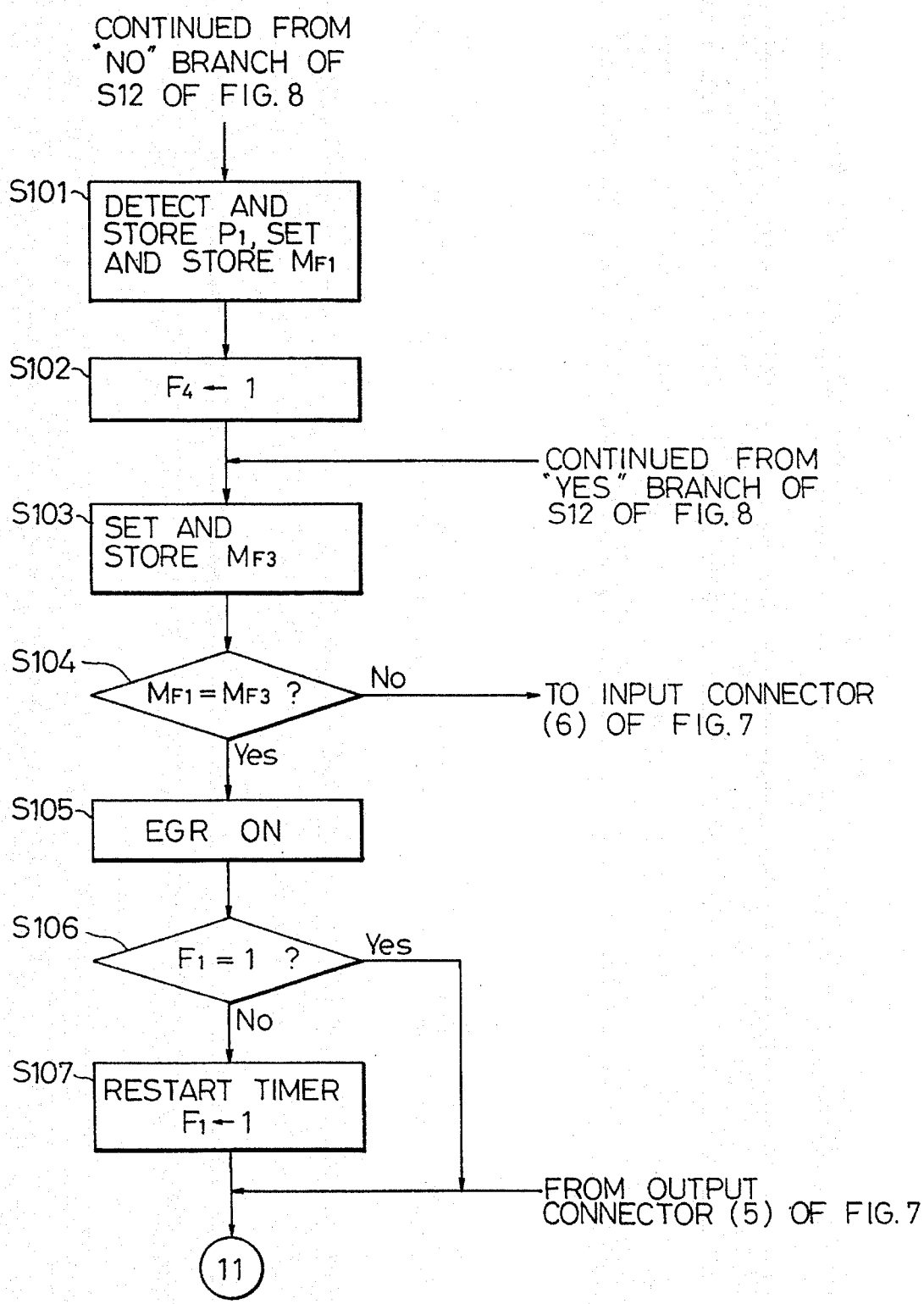
FIG. 12 is a flowchart showing a primary part, continued from step S12 of FIG. 8, of the failure determination routine carried out in a failure determination method according to a second embodiment of the present invention.

For instance, in the second embodiment, at the EGR check start point where the specified time $T_2$ has elapsed from the moment the EGR was turned OFF, the value indicative of the then fuel control mode is set as the program variable $M_{F1}$ in the step S101 of FIG. 12, so as to start the determination of the fuel control mode. Alternatively, the determination of the fuel control mode may be begun before the EGR check is started. In this case, for example, the program variable $M_{F1}$ is set each time the engine operation in the EGR check zone is determined in the step S2 of FIG. 7. Further, in the second embodiment, the fuel control mode is determined in the step S104 of FIG. 12 during the EGR check, but this determination may be omitted. In this case, the steps S103 and S104 of FIG. 12 are unnecessary.

In the fourth or fifth embodiment, the variation $\Delta P$ in the intake manifold pressure during the EGR check is corrected by using the correction value $P_{CNE}$ in accordance with the variation of the engine speed ($Ne_2-Ne_1$) or the variation of the ISC valve opening degree ($\theta_2-\theta_1$) during the EGR check, thereby preventing erroneous determination caused by a change in the intake manifold pressure due to a change in the engine speed or a change in the ISC valve opening degree. Alternatively, the failure determination value $\Delta P_{EGR}$ may be corrected in accordance with the variation of the engine speed or the variation of the ISC valve opening degree during the EGR check.

Furthermore, in the aforesaid embodiments, the stepping motor for driving the ISC valve is subjected to the open-loop control to adjust the ISC valve opening degree, but the motor may alternatively be subjected to feedback control to adjust the valve opening degree. In this case, an ISC valve opening degree sensor is used for the ISC valve opening degree detection in the step S201 of FIG. 14, etc.

From the above-described embodiments of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A method for determining a failure of an EGR apparatus, comprising:

(a) detecting an intake state in an intake passage of an engine while temporarily permitting and inhibiting circulation of exhaust gas from said exhaust passage of said engine to said intake passage of said engine while said engine is running in a specified operation zone;

(b) comparing said intake state when circulation of said exhaust gas is being permitted and said intake state in said intake passage when circulation of said exhaust gas is being inhibited;

(c) determining a failure of the EGR apparatus according to a result of a comparison in said step (b); and (d) restricting a change in an engine operation state other than said intake state detected in said step (a) when a failure of said EGR apparatus is being determined in said step (c).

2. The method according to claim 1, wherein the specified operation zone is a decelerated operation zone of the engine.

3. The method according to claim 1, wherein the intake state in the intake passage is an intake pressure in the intake passage.

4. The method according to claim 1, wherein said step (d) includes restricting the change in the engine operation state by prohibiting a change in intake information in a bypass passage provided in the intake passage and bypassing a throttle valve disposed in the intake passage.

5. The method according to claim 4, wherein the change in the intake information is a change in an opening degree of a bypass control valve, which change takes place when an amount of air supplied to the engine via the bypass passage is adjusted by a bypass control valve.

6. A method for determining a failure of an EGR apparatus, comprising:
 (a) detecting an intake state in an intake passage of an engine while temporarily permitting and inhibiting circulation of exhaust gas from an exhaust passage of said engine to said intake passage of said engine while said engine is running in a decelerated operation zone;
 (b) comparing said intake state when circulation of said exhaust gas is being permitted and said intake state in said intake passage when circulation of said exhaust gas is being inhibited;
 (c) determining a failure of said EGR apparatus according to a result of a comparison in said step (b);
 (d) detecting a change in an engine operation state other than said intake state in said intake passage; and
 (e) restricting failure determination of said EGR apparatus in said step (c) in accordance with said change in said engine operation state detected in said step (d).

7. The method according to claim 6, wherein the change in the engine operation state is a change in engine revolution information.

8. The method according to claim 7, wherein the change in the engine revolution information is a variation of engine speed produced during a specified period of time.

9. The method according to claim 8, wherein the variation of the engine speed is a difference between an engine speed obtained when the EGR control valve is closed and an engine speed obtained when the EGR control valve is open.

10. The method according to claim 6, wherein the change in the engine operation state is a change in a state of fuel supply to the engine.

11. The method according to claim 10, wherein the change in the state of fuel supply is a change in a control mode which takes place when one of a plurality of control modes set beforehand is selected in association with control of an amount of fuel supplied to the engine, the control being performed by a fuel supply control means.

12. The method according to claim 11, wherein either a control mode before the change in control mode takes place or a control mode after the change in control mode takes place is a fuel-cut mode in which the fuel supply to the engine is interrupted.

13. The method according to claim 6, wherein the change in the engine operation state is a change in intake information in a bypass passage, which change takes place when an amount of air supplied to the engine via the bypass passage is adjusted by a bypass control valve, the bypass passage being provided in the intake passage and bypassing a throttle valve provided in the intake passage.

14. The method according to claim 13, wherein the change in the intake information in the bypass passage is a variation of an opening degree of the bypass control valve during a specified period of time.

15. The method according to claim 14, wherein the variation of the opening degree of the bypass control valve is a difference between an opening degree of the bypass control valve when the EGR control valve is closed and an opening degree of the bypass control valve when the EGR control valve is open.

16. The method according to claim 6, wherein said step (e) includes restricting the failure determination by aborting the failure determination.

17. The method according to claim 16, wherein the specified operation zone is a decelerated operation zone of the engine.

18. The method according to claim 17, wherein said step (e) includes determining whether the detected change in the engine operation state exerts influences on the intake state in the intake passage, and aborting the failure determination of the EGR apparatus when it is determined that the change in the engine operation state exerts influences on the intake state in the intake passage.

19. The method according to claim 18, wherein the change in the engine operation state is a change in engine revolution information.

20. The method according to claim 19, wherein it is determined that the change in the engine operation state exerts influences on the intake state in the intake passage if the change in the engine revolution information is greater than a preset reference value.

21. The method according to claim 17, wherein the change in the engine operation state is a change in a state of fuel supply to the engine.

22. The method according to claim 21, wherein the change in the state of fuel supply is a change in control mode which takes place when one of the plurality of control modes set beforehand is selected in association with control of an amount of fuel supplied to the engine, the control being performed by a fuel supply control means.

23. The method according to claim 22, wherein either a control mode before a change in the control mode takes place or a control mode after the change in the control mode takes place is a fuel-cut mode in which the fuel supply to the engine is interrupted.

24. The method according to claim 17, wherein a change in intake information in a bypass passage, which change takes place when an amount of air supplied to the engine via the bypass passage is adjusted by a bypass control valve, is detected as the change in the engine operation state, the bypass passage being provided in the intake passage and bypassing a throttle valve disposed in the intake passage.

25. The method according to claim 24, wherein the change in the intake information in the bypass passage is a variation of an opening degree of the bypass control valve in a specified period of time.

26. The method according to claim 25, wherein the variation of the opening degree of the bypass control valve is a difference between an opening degree of the bypass control valve when the EGR control valve is closed and an opening degree of the bypass control valve when the EGR control valve Is open.

27. The method according to claim 6, wherein said step (e) includes restricting the failure determination by correcting an intake state detected by an intake state detection means.

28. The method according to claim 27, wherein the specified operation zone is a decelerated operation zone of the engine.

29. The method according to claim 28, wherein the detected intake state is corrected in accordance with the change in the engine operation state.

30. The method according to claim 29, wherein the change in the engine operation state is a change in engine revolution information.

31. The method according to claim 30, wherein the change in the engine revolution information is a variation of an engine speed in a specified period of time.

32. The method according to claim 28, wherein a change in intake information in a bypass passage, which change takes place when an amount of air supplied to the engine via the bypass passage is adjusted by a bypass control valve, is detected as the change in the engine operation state, the bypass passage being provided in the intake passage and bypassing a throttle valve disposed in the intake passage.

33. The method according to claim 32, wherein the change in the information on the intake in the bypass passage is a variation of an opening degree of the bypass control valve in a specified period of time.

34. The method according to claim 33, wherein the variation of the opening degree of the bypass control valve is a difference between an opening degree of the bypass control valve when the EGR control valve is closed and an opening degree of the bypass control valve when the EGR control valve is open.

* * * * *